(12) United States Patent
Yamanouchi et al.

(10) Patent No.: US 11,634,092 B2
(45) Date of Patent: Apr. 25, 2023

(54) WIRE HARNESS CAPABLE OF SUPPRESSING A DECREASE IN INSULATION RELIABILITY

(71) Applicant: SUMITOMO WIRING SYSTEMS, LTD., Yokkaichi (JP)

(72) Inventors: Hiroki Yamanouchi, Yokkaichi (JP); Takuji Iwama, Yokkaichi (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 0 days.

(21) Appl. No.: 17/586,048

(22) Filed: Jan. 27, 2022

(65) Prior Publication Data

US 2022/0258682 A1 Aug. 18, 2022

(30) Foreign Application Priority Data

Feb. 12, 2021 (JP) .............................. JP2021-021257

(51) Int. Cl.
*B60R 16/02* (2006.01)
*H02G 3/04* (2006.01)
*H01B 7/00* (2006.01)

(52) U.S. Cl.
CPC ....... *B60R 16/0215* (2013.01); *H02G 3/0462* (2013.01); *H02G 3/0468* (2013.01); *H01B 7/0045* (2013.01)

(58) Field of Classification Search
CPC .............. B60R 16/0215; H02G 3/0462; H02G 3/0468; H01B 7/0045
USPC ........................................................ 174/72 A
See application file for complete search history.

(56) References Cited

U.S. PATENT DOCUMENTS

2015/0334882 A1* 11/2015 Sugino ................. H02G 3/0481
29/428
2019/0126861 A1* 5/2019 Nakai ...................... H02G 3/04

FOREIGN PATENT DOCUMENTS

JP 2017-062995 A 3/2017

* cited by examiner

*Primary Examiner* — Timothy J Thompson
*Assistant Examiner* — Michael F McAllister
(74) *Attorney, Agent, or Firm* — Oliff PLC

(57) ABSTRACT

A wire harness including a plurality of first electric wire members that each have a first flexible electric wire and a hard electric wire electrically connected to the first flexible electric wire: a plurality of second electric wire members that are second flexible electric wires: a tube through which the plurality of first electric wire members and the plurality of second electric wire members pass: and a first fixing member for bundling the plurality of first electric wire members and the plurality of second electric wire members, wherein: the tube includes a bend closest to an end surface in a longitudinal direction of the tube, and the wire harness is configured to achieve a first arrangement and a second arrangement.

9 Claims, 11 Drawing Sheets

WIRE HARNESS CAPABLE OF SUPPRESSING A DECREASE IN INSULATION RELIABILITY

This application claims priority from Japanese Patent Application No. 2021-021257 filed Feb. 12, 2021, the entire disclosure of which is incorporated herein by reference.

BACKGROUND

The present disclosure relates to a wire harness.

Conventionally, wire harnesses to be used in vehicles such as hybrid cars and electric cars include electric wires for electrically connecting electric apparatuses such as a high-voltage battery and an inverter (see JP 2017-62995A, for example). In this type of wire harness, a plurality of electric wires are collectively surrounded by a metal pipe made of a metal for the purpose of protecting the electric wires and taking measures against noise.

SUMMARY

In the case of a conventional wire harness, the metal pipe is bent in a state in which a plurality of electric wires are inserted into the metal pipe. As shown in FIG. 16, a plurality of electric wires 110 and 120 inserted into a metal pipe 100 are simultaneously bent during this bending process. As a result, the electric wires 110 and 120 come into contact with the inner circumferential surface of the metal pipe 100 at an inner bent part 102 of a bent portion 101 of the metal pipe 100. At this time, as shown in FIG. 17, the electric wires 110 and the electric wires 120 may overlap each other at the inner bent part 102. In this case, the electric wires 120 may be compressed between the inner surface of the inner bent part 102 of the metal pipe 100 and the outer circumferential surfaces of the electric wires 110. This compression may cause a problem in that the thicknesses of insulating coatings 121 of the electric wires 120 are reduced, thus resulting in a decrease in the insulation reliability of the electric wires 120.

An exemplary aspect of the disclosure provides a wire harness capable of suppressing a decrease in insulation reliability.

A wire harness of the present disclosure includes: a plurality of first electric wire members that each have a first flexible electric wire and a hard electric wire electrically connected to the first flexible electric wire: a plurality of second electric wire members that are second flexible electric wires: a tube through which the plurality of first electric wire members and the plurality of second electric wire members pass: and a first fixing member for bundling the plurality of first electric wire members and the plurality of second electric wire members, wherein the tube includes a bend closest to an end surface in a longitudinal direction of the tube, the wire harness is configured to achieve a first arrangement and a second arrangement, an arrangement of the plurality of first electric wire members and the plurality of second electric wire members inside the bend is the first arrangement in which the plurality of first electric wire members are lined up in a first direction and the plurality of second electric wire members are lined up in a second direction that intersects the first direction in a state in which the plurality of first electric wire members are located therebetween, and an arrangement of the plurality of first electric wire members and the plurality of second electric wire members at a first position located outside the tube is the second arrangement in which the plurality of first electric wire members are lined up in a third direction and the plurality of second electric wire members are lined up in a state in which the plurality of first electric wire members are not located therebetween.

The wire harness of the present disclosure exhibits an effect of suppressing a decrease in insulation reliability.

DETAILED DESCRIPTION OF EMBODIMENTS

Figure 1:
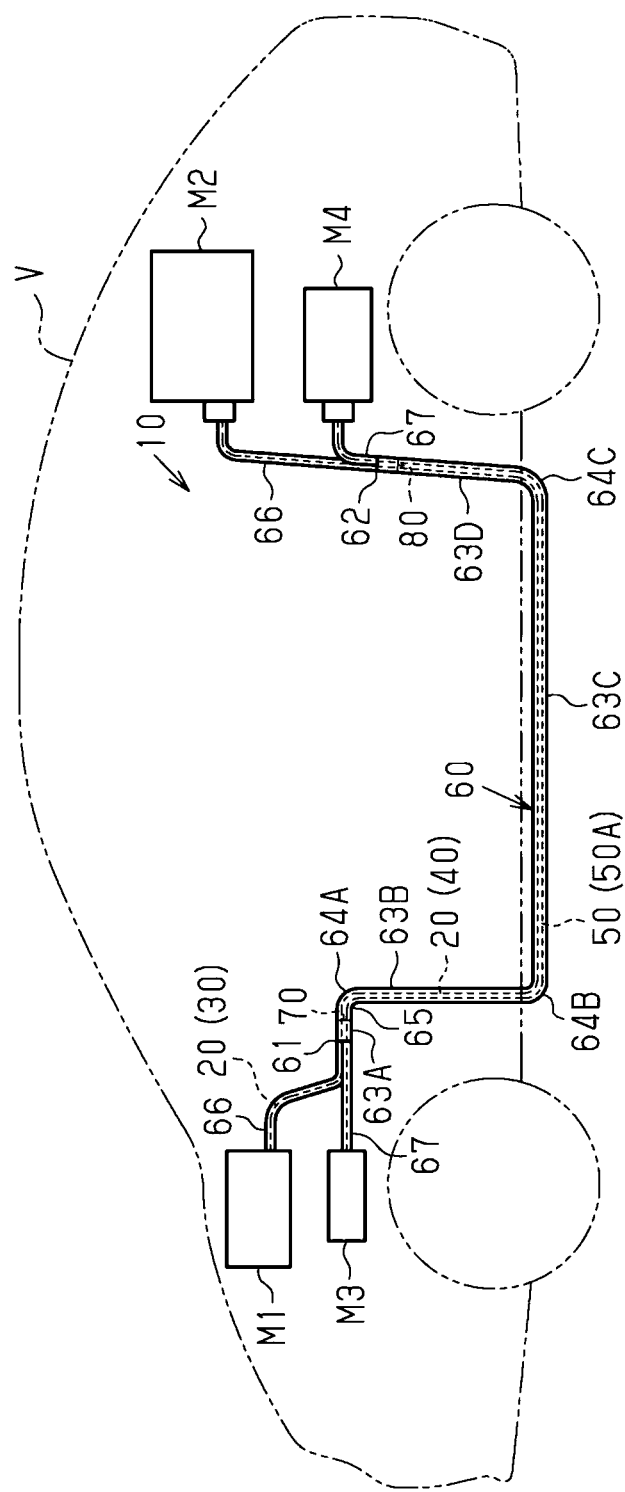
FIG. 1 is a schematic configuration diagram illustrating a wire harness of an embodiment.

Description of Embodiments of the Present Disclosure

First, embodiments of the present disclosure will be listed and described.

(1) A wire harness of the present disclosure includes: a plurality of first electric wire members that each have a first flexible electric wire and a hard electric wire electrically connected to the first flexible electric wire: a plurality of second electric wire members that are second flexible electric wires: a tubular member through which the plurality of first electric wire members and the plurality of second electric wire members pass: and a first fixing member for bundling the plurality of first electric wire members and the plurality of second electric wire members, wherein the tubular member includes a bent portion closest to an end surface in a longitudinal direction of the tubular member, an arrangement of the first electric wire members and the second electric wire members inside the bent portion is a first arrangement in which the plurality of first electric wire members are lined up in a first direction and the plurality of second electric wire members are lined up in a second direction that intersects the first direction in a state in which the first electric wire members are located therebetween, and an arrangement of the first electric wire members and the second electric wire members at a first position located outside the tubular member is a second arrangement in which the plurality of first electric wire members are lined up in a third direction and the plurality of second electric wire members are lined up in a state in which the first electric wire members are not located therebetween.

With this configuration, inside the bent portion, the plurality of second electric wire members are lined up in a state in which the plurality of first electric wire members are located therebetween. That is, in the bent portion, the plurality of second electric wire members are spaced apart from each other by the plurality of first electric wire members. Accordingly, if two first electric wire members are in contact with the inner surface of the inner bent part of the bent portion, and a space is formed between the outer circumferential surfaces of the two first electric wire members and the inner surface of the inner bent part, for example, only one of the plurality of second electric wire members is arranged in this space. Thus, it is possible to keep the second electric wire members from being compressed by the outer circumferential surfaces of the first electric wire members and the inner circumferential surface of the tubular member compared with a configuration in which the plurality of second electric wire members are arranged in the above-mentioned space. As a result, it is possible to suppress damage to the insulating coatings of the first electric wire members and the insulating coatings of the second electric wire members. Accordingly, it is possible to suppress a decrease in the insulation reliability of the first electric wire members and the second electric wire members. Furthermore, at the first position located outside the tubular member, the plurality of second electric wire members are lined up in a state in which the plurality of first electric wire members are not located therebetween. That is, at the first position, the plurality of second electric wire members are collectively arranged, while the plurality of first electric wire members are collectively arranged. Accordingly, if the plurality of first electric wire members and the plurality of second electric wire members diverge from each other into different paths outside the tubular member, for example, the divergence of the plurality of first electric wire members and the plurality of second electric wire members can be easily achieved. Thus, it is possible to make the routing of the wire harness outside the tubular member easier. Here, the term "tubular" as used herein encompasses not only such a shape that is formed by a circumferential wall continuously formed over the entire circumference in the circumferential direction, but also a tubular shape formed by an assembly of a plurality of components, and a shape such as a C-shape in which a portion in the circumferential direction is cut out. Moreover, the external edge of the "tubular shape" may have a circular shape, an elliptical shape, or a polygonal shape with sharp corners or rounded corners.

(2) It is preferable that the first electric wire members have a circular lateral cross-sectional shape, the second electric wire members have a circular lateral cross-sectional shape, and in the first arrangement, the plurality of first electric wire member are in external contact with each other, and the plurality of second electric wire member are respectively provided in a plurality of gaps formed between outer circumferences of the plurality of first electric wire members. With this configuration, the plurality of second electric wire members are respectively provided in the plurality of gaps formed between the plurality of first electric wire members in the bent portion. Accordingly, it is possible to favorably keep the plurality of second electric wire members from being arranged in the space between the outer circumferential surfaces of the plurality of first electric wire members and the inner surface of the inner bent part in the bent portion. Thus, it is possible to favorably keep the second electric wire members from being compressed by the outer circumferential surfaces of the first electric wire members and the inner circumferential surface of the tubular member.

(3) It is preferable that the wire harness further includes: a holder attached to an end portion in the longitudinal direction of the tubular member; and a second fixing member for fixing the plurality of first electric wire members and the plurality of second electric wire members to the holder, wherein the holder includes a tubular main body portion, and a fixation portion that protrudes from an end surface in an axial direction of the main body portion and is arranged outside the tubular member, the second fixing member fixes the plurality of first electric wire members and the plurality of second electric wire members to the fixation portion, the first position is a position at which the second fixing member is provided, and at the first position, the plurality of second electric wire members are provided at a position where the plurality of second electric wire members are not sandwiched between the fixation portion and the first electric wire members and are spaced apart from the fixation portion. With this configuration, the plurality of first electric wire members and the plurality of second electric wire members are fixed to the fixation portion of the holder using the second fixing member. Thus, it is possible to keep the arrangement of the first electric wire members and the second electric wire members relative to the fixation portion, and to favorably keep the arrangement of the first electric wire members and the second electric wire members at the first position as the second arrangement. Moreover, at the first position, the plurality of second electric wire members are lined up at a position where they are not sandwiched between the fixation portion and the first electric wire members and are spaced apart from the fixation portion. Thus, the plurality of second electric wire members are not sandwiched between the fixation portion and the first electric wire members, thus making it possible to easily branch the second electric wire members from the first electric wire members. Moreover, it is possible to favorably keep the second electric wire members from being compressed between the first electric wire members and the fixation portion, thus making it possible to suppress damage to the insulating coatings of the first electric wire members and the insulating coatings of the second electric wire members.

(4) It is preferable that the plurality of first electric wire members overlap a straight line extending from the fixation portion in a radial direction of the main body portion. With this configuration, the plurality of first electric wire members overlap the straight line that extends from the fixation portion in the radial direction of the main body portion. Thus, at the first position, the fixation portion and the plurality of first electric wire members are lined up on the above-mentioned straight line. Accordingly, the space that is not sandwiched between the first electric wire members and the fixation portion can be made larger, for example, compared with a configuration in which the plurality of first electric wire members are arranged side by side relative to the fixation portion. As a result, it is possible to favorably provide the plurality of second electric wire members at a position where they are not sandwiched between the fixation portion and the first electric wire members.

(5) It is preferable that each of the first electric wire members includes a connection portion where the first flexible electric wire and the hard electric wire are joined to each other, the connection portion is provided between the bent portion and the first position in a longitudinal direction of the first electric wire members and is housed inside the tubular member, and at least one of the plurality of second electric wire members is rearranged, thereby changing the arrangement of the first electric wire members and the second electric wire members from the first arrangement to the second arrangement in a region between the connection portion and the first position. With this configuration, it is possible to change the arrangement of the first electric wire members and the second electric wire members from the first arrangement to the second arrangement by rearranging the second electric wire member that includes a single second flexible electric wire. Thus, unlike a configuration in which the first electric wire member that includes the connection portion is rearranged, it is possible to favorably suppress breaking of the second electric wire member even when the second electric wire member is rearranged while being twisted. Here, the phrase "the second electric wire member is rearranged" as used herein means that the wiring path of the second electric wire member is changed such that the relative position of the second electric wire member relative to the plurality of first electric wire members is changed in the lateral cross section.

(6) It is preferable that the first fixing member is provided between the connection portion and the first position in the longitudinal direction of the first electric wire members, and the first fixing member keeps the arrangement of the first electric wire members and the second electric wire members as the first arrangement. With this configuration, it is possible to keep the arrangement of the first electric wire members and the second electric wire members between the connection portion and the first position as the first arrangement using the first fixing member.

(7) It is preferable that at least one of the plurality of second electric wire members is rearranged, thereby changing the arrangement of the first electric wire members and the second electric wire members from the first arrangement to the second arrangement in a region between the first fixing member and the first position. With this configuration, it is possible to favorably rearrange the second electric wire member using, as a fixation point, the first fixing member that keeps the arrangement of the first electric wire members and the second electric wire members as the first arrangement.

(8) It is preferable that at least one of the plurality of second electric wire members is rearranged, thereby changing the arrangement of the first electric wire members and the second electric wire members from the first arrangement to the second arrangement outside the tubular member. With this configuration, the second electric wire member is rearranged outside the tubular member. Thus, even if the external shape of the collective structure constituted by the plurality of first electric wire members and the plurality of second electric wire members increases in size in one direction during the rearrangement of the second electric wire member, for example, there is no need to set the size of the tubular member to a size corresponding to the increased size of the external shape. Accordingly, it is possible to suppress an increase in the size of the tubular member. Thus, it is possible to suppress an increase in the size of the wire harness.

(9) It is preferable that the hard electric wires in the longitudinal direction of the first electric wire members are provided at the bent portion, and the first flexible electric wires in the longitudinal direction of the first electric wire members are provided at the first position. With this configuration, it is possible to keep the second electric wire members from being compressed by the outer circumferential surfaces of the plurality of hard electric wires and the inner circumferential surface of the tubular member in the bent portion. As a result, it is possible to suppress damage to the insulating coatings of the hard electric wires and the insulating coatings of the second electric wire members.

Details of Embodiments of the Present Disclosure

The following describes specific embodiments of a wire harness of the present disclosure with reference to the drawings. A portion of the configuration may be exaggerated or simplified for illustrative purposes in the diagrams. In addition, the ratios between the dimensions of portions shown in the diagrams may be different from each other. The terms "parallel" and "orthogonal" as used herein encompass not only "precisely parallel" and "precisely orthogonal" but also "substantially parallel" and "substantially orthogonal", as long as the functions and effects of these embodiments are exhibited. The term "perfect circle" as used herein encompass not only "precisely perfect circle" but also "substantially perfect circle", as long as the functions and effects of these embodiments are exhibited. Note that the present disclosure is not limited to these embodiments and is defined by the scope of the appended claims, and all changes that fall within the same essential spirit as the scope of the claims are intended to be included therein.

Overall Configuration of Wire Harness 10

As shown in FIG. 1, a wire harness 10 electrically connects two or three or more electric apparatuses M1, M2, M3, and M4. The wire harness 10 is installed, for example, in a vehicle V such as a hybrid car or an electric car. The wire harness 10 includes a plurality of (two in this embodiment) electric wire members 20 that electrically connect the electric apparatus M1 and the electric apparatus M2, and a plurality of (two in this embodiment) electric wire members 50 that electrically connect the electric apparatus M3 and the electric apparatus M4. The wire harness 10 includes, for example, a tubular member 60 (tube) through which the electric wire members 20 and the electric wire members 50 pass, a tubular exterior member 66 that surrounds the portions of the electric wire members 20 extending from the tubular member 60, and a tubular exterior member 67 that surrounds the portions of the electric wire members 50 extending from the tubular member 60. The wire harness 10 includes, for example, a holder 70 provided at an end portion 61 on one side in the longitudinal direction (axial direction) of the tubular member 60, and a holder 80 provided at an end portion 62 on the other side in the longitudinal direction of the tubular member 60. The tubular member 60 and the exterior members 66 and 67 protect the electric wire members 20 and 50 housed therein from flying objects and waterdrops.

Configuration of Electric Wire Member 20

One end portion of each electric wire member 20 is connected to the electric apparatus M1, and the other end portion of each electric wire member 20 is connected to the electric apparatus M2. An example of the electric apparatus M1 is an inverter that is installed in the front portion of the vehicle V, and an example of the electric apparatus M2 is a high-voltage battery that is installed on the rear side of the vehicle V with respect to the electric apparatus M1. The inverter is connected, for example, to a wheel driving motor that serves as a power source for vehicle travel. The high-voltage battery can supply, for example, a voltage of a hundred volts or more.

Figure 2:
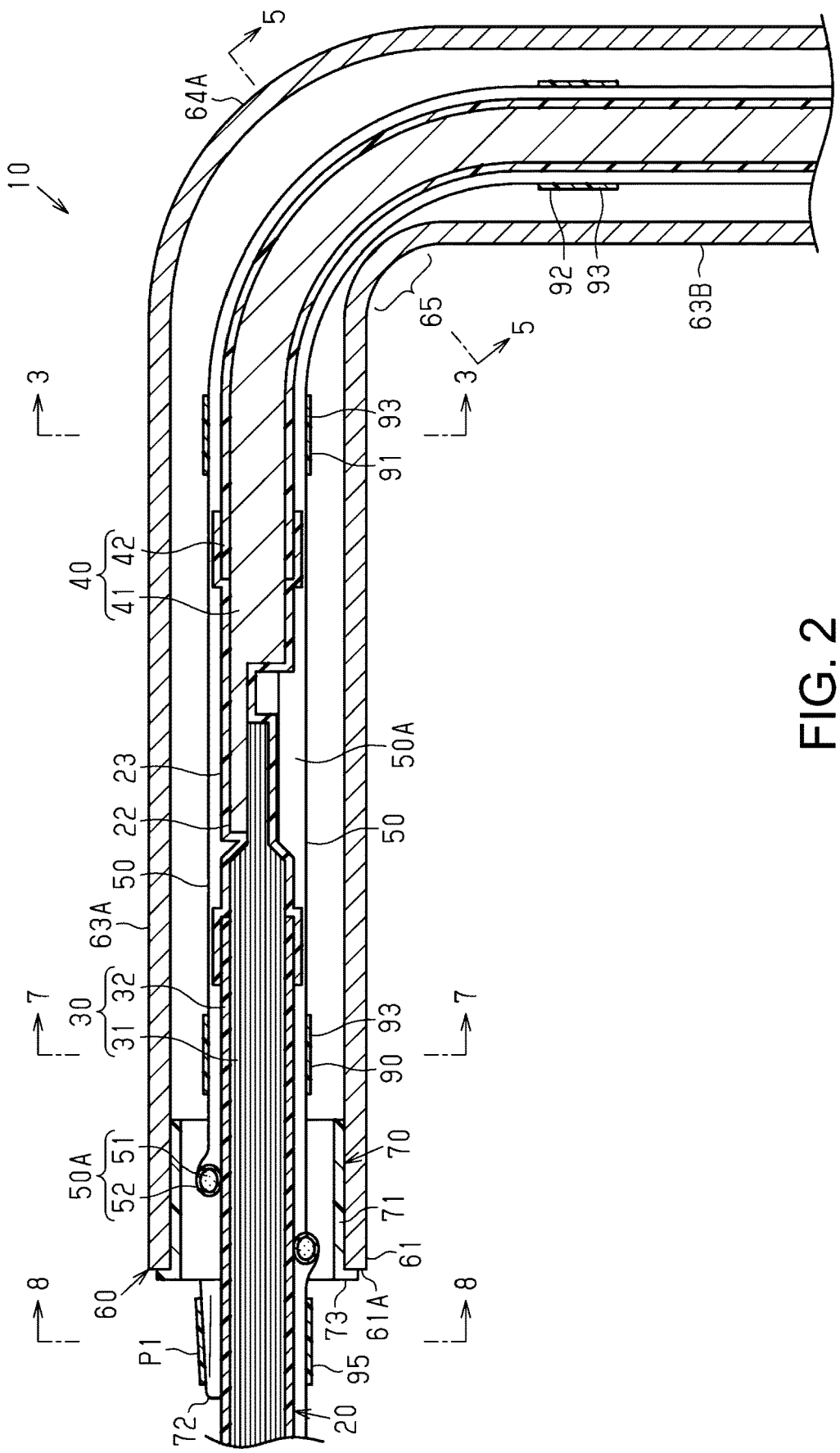
FIG. 2 is a schematic cross-sectional view illustrating the wire harness of the embodiment.

As shown in FIG. 2, each electric wire member 20 includes a flexible electric wire 30, and a hard electric wire 40 that is electrically connected to the flexible electric wire 30. The electric wire member 20 is formed by electrically connecting the flexible electric wire 30 and the hard electric wire 40, which are different types of electric wires, in the longitudinal direction of the electric wire member 20. The electric wire member 20 includes a connection portion 22 (connection) where the flexible electric wire 30 and the hard electric wire 40 are joined to each other, and a covering member 23 that covers the outer circumference of the connection portion 22. In the electric wire member 20, the flexible electric wires 30 are connected to both end portions in the longitudinal direction of the hard electric wire 40. The flexible electric wire 30 and the hard electric wire 40 are, for example, high-voltage electric wires to which a high voltage/a large current can be applied. The flexible electric wire 30 and the hard electric wire 40 may each be, for example, a shielded electric wire having an electromagnetic shielding structure, or a non-shielded electric wire having no electromagnetic shielding structure. The flexible electric wire 30 and the hard electric wire 40 of this embodiment are non-shielded electric wires. Note that, although FIG. 2 shows the structures of the electric wire members 20 and 50 at the end portion 61 of the tubular member 60, the structures of the electric wire members 20 and 50 at the end portion 62 of the tubular member 60 (see FIG. 1) are the same as these structures.

Configuration of Flexible Electric Wire 30

The flexible electric wire 30 is, for example, more flexible than the hard electric wire 40. The flexible electric wire 30 has, for example, higher bendability than the hard electric wire 40.

The flexible electric wire 30 includes a core wire 31 constituted by a plurality of metal strands, and an insulating coating 32 that covers the outer circumference of the core wire 31. Examples of the core wire 31 include a stranded wire formed by twisting a plurality of metal strands together, and a braided member formed by braiding a plurality of metal strands into a tubular shape. The core wire 31 of this embodiment is a stranded wire. Examples of the material of the core wire 31 include metal materials such as copper-based materials and aluminum-based materials.

The insulating coating 32 covers, for example, the outer circumferential surface of the core wire 31 over the entire circumference in the circumferential direction thereof. The insulating coating 32 is made of, for example, an insulating material such as a synthetic resin.

The shape of the cross section of the flexible electric wire 30 taken along a plane orthogonal to the longitudinal direction of the flexible electric wire 30, namely the lateral cross-sectional shape of the flexible electric wire 30, may be a desired shape. The lateral cross-sectional shape of the flexible electric wire 30 may be, for example, a circular shape, a semicircular shape, a polygonal shape, a square shape, or a flat shape. The lateral cross-sectional shape of the flexible electric wire 30 of this embodiment is a perfect circle.

Configuration of Hard Electric Wire 40

The hard electric wire 40 has, for example, higher flexural rigidity than the flexible electric wire 30. The hard electric wire 40 has, for example, such rigidity that enables the hard electric wire 40 to keep a shape extending along the wiring path of the electric wire member 20.

The hard electric wire 40 includes, for example, a single-core wire 41 constituted by a single conductor, and an insulating coating 42 that covers the outer circumference of the single-core wire 41. Examples of the single-core wire 41 include a columnar conductor constituted by a single columnar metal rod having a solid structure, and a tubular conductor having a hollow structure. The single-core wire 41 of this embodiment is a columnar conductor. Examples of the material of the single-core wire 41 include metal materials such as copper-based materials and aluminum-based materials.

The insulating coating 42 covers, for example, the outer circumferential surface of the single-core wire 41 over the entire circumference in the circumferential direction thereof. The insulating coating 42 is made of, for example, an insulating material such as a synthetic resin. For example, a heat-shrinkable tube or a rubber tube can also be used as the insulating coating 42.

The lateral cross-sectional shape of the hard electric wire 40 may be a desired shape. The lateral cross-sectional shape of the hard electric wire 40 of this embodiment is a perfect circle.

Configuration of Connection Portion 22

The core wire 31 and the single-core wire 41 are joined to each other at the connection portion 22. Specifically, the core wire 31 exposed from the insulating coating 32 at an end portion in the longitudinal direction of the flexible electric wire 30 is joined to the single-core wire 41 exposed from the insulating coating 42 at an end portion in the longitudinal direction of the hard electric wire 40. For example, at the connection portion 22, the core wire 31 and the single-core wire 41 are stacked in the radial direction, namely a direction that intersects the longitudinal direction of the core wire 31 and the single-core wire 41, and are joined to each other. Note that there is no particular limitation on the method of connecting the core wire 31 and the single-core wire 41. Examples of the method of connecting the core wire 31 and the single-core wire 41 include supersonic welding and laser welding.

Configuration of Covering Member 23

The covering member 23 is formed, for example, in an elongated tubular shape. The covering member 23 covers the outer circumference of the connection portion 22. For example, the covering member 23 spans the end portion of the insulating coating 32 and the end portion of the insulating coating 42. For example, one end portion of the covering member 23 covers the outer circumferential surface of the end portion of the insulating coating 32, and the other end portion of the covering member 23 covers the outer circumferential surface of the end portion of the insulating coating 42. The covering member 23 surrounds the outer circumference of the flexible electric wire 30 and the outer circumference of the hard electric wire 40 over the entire circumference in the circumferential direction thereof. The covering member 23 has, for example, a function of keeping the connection portion 22 electrically insulated. Examples of the covering member 23 include a shrinkable tube, a rubber tube, a resin mold, a hot melt adhesive, and a tape member. The covering member 23 of this embodiment is a heat-shrinkable tube.

Here, the hard electric wire 40 is provided, for example, inside the tubular member 60. For example, the tubular member 60 surrounds the hard electric wire 40 over the entire length in the longitudinal direction of the hard electric wire 40. The connection portion 22 is provided, for example, inside the tubular member 60. For example, an end portion in the longitudinal direction of the flexible electric wire 30 is provided inside the tubular member 60. The flexible electric wire 30 is provided such that a portion thereof extends toward the outside of the tubular member 60 from the end portion 61 in the longitudinal direction of the tubular member 60.

Configuration of Electric Wire Member 50

As shown in FIG. 1, one end portion of each electric wire member 50 is connected to the electric apparatus M3, and the other end portion of each electric wire member 50 is connected to the electric apparatus M4. An example of the electric apparatus M3 is a relay box that is installed in the front portion of the vehicle V, and an example of the electric apparatus M4 is a low-voltage battery that is installed in the rear portion of the vehicle V. The relay box distributes a voltage supplied from the low-voltage battery to various apparatuses installed in the vehicle V. The low-voltage battery can supply a lower voltage (e.g., 12 volts) than the high-voltage battery does.

Figure 3:
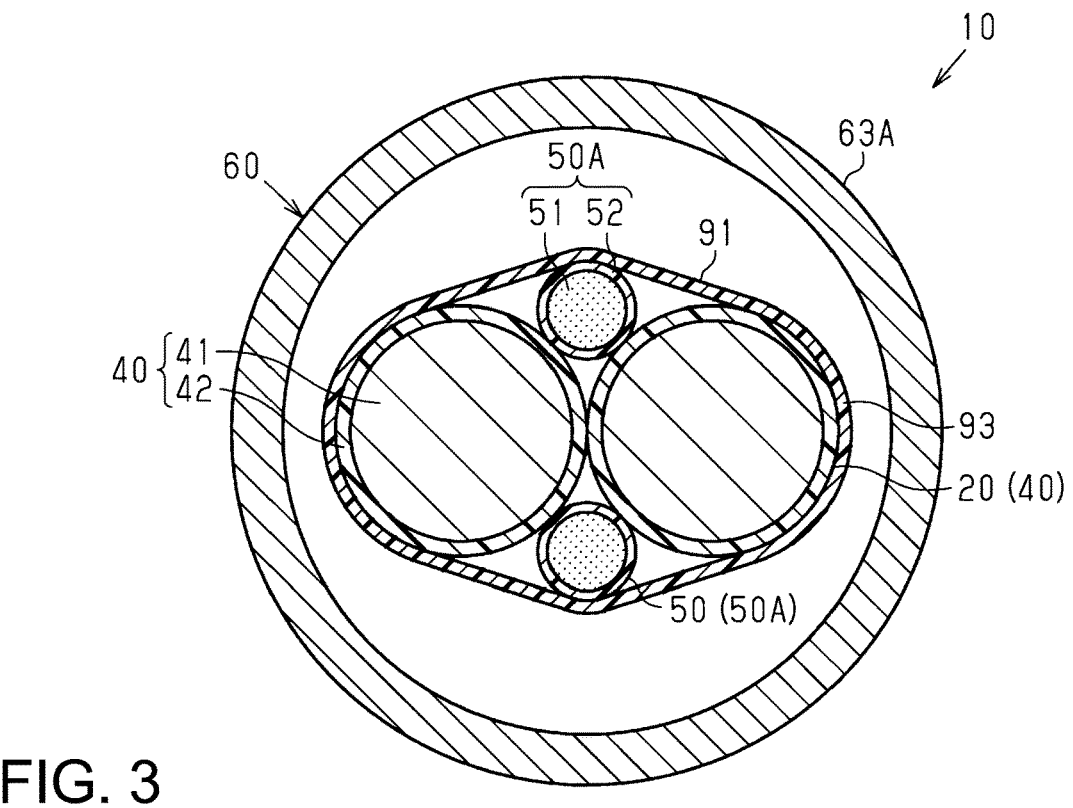
FIG. 3 is a schematic lateral cross-sectional view illustrating the wire harness of the embodiment (a cross-sectional view taken along line 3-3 in FIG. 2).

As shown in FIG. 3, the electric wire members 50 are flexible electric wires 50A. That is, each electric wire member 50 is constituted by only a single flexible electric wire 50A. The flexible electric wire 50A extends over the entire length in the longitudinal direction of the electric wire member 50. The flexible electric wire 50A is, for example, a low-voltage electric wire. The flexible electric wire 50A may be, for example, a shielded electric wire or a non-shielded electric wire. The flexible electric wire 50A of this embodiment is a non-shielded electric wire.

Configuration of Flexible Electric Wire 50A

The flexible electric wire 50A is, for example, more flexible than the hard electric wire 40. The flexible electric wire 50A has, for example, higher bendability than the hard electric wire 40.

The flexible electric wire 50A includes a core wire 51 constituted by a plurality of metal strands, and an insulating coating 52 that covers the outer circumference of the core wire 51. Examples of the core wire 51 include a stranded wire and a braided member. The core wire 51 of this embodiment is a stranded wire. Examples of the material of the core wire 51 include metal materials such as copper-based materials and aluminum-based materials.

The insulating coating 52 covers, for example, the outer circumferential surface of the core wire 51 over the entire circumference in the circumferential direction thereof. The insulating coating 52 is made of, for example, an insulating material such as a synthetic resin.

The lateral cross-sectional shape of the flexible electric wire 50A may be a desired shape. The lateral cross-sectional shape of the flexible electric wire 50A of this embodiment is a perfect circle. The outer diameter of the flexible electric wire 50A is, for example, smaller than the outer diameter of the hard electric wire 40. The outer diameter of the flexible electric wire 50A is, for example, smaller than the outer diameter of the flexible electric wire 30 (see FIG. 2).

As shown in FIG. 1, for example, an intermediate portion in the longitudinal direction of the flexible electric wire 50A is provided inside the tubular member 60. For example, the intermediate portion in the longitudinal direction of the flexible electric wire 50A is housed inside the tubular member 60 together with the electric wire members 20. Both end portions in the longitudinal direction of the flexible electric wire 50A respectively extend toward the outside of the tubular member 60 from the end portions 61 and 62 in the longitudinal direction of the tubular member 60.

Configuration of Tubular Member 60

The tubular member 60 is formed in an elongated tubular shape. The tubular member 60 of this embodiment is formed in a tubular shape whose cross-sectional shape is a perfect circle. That is, the lateral cross-sectional shape of the tubular member 60 of this embodiment is a perfect circle. For example, the intermediate portions in the longitudinal directions of the electric wire members 20 and 50 are housed inside the tubular member 60. The inner diameter of the tubular member 60 is set to, for example, a size that enables the two electric wire members 20 and the two electric wire members 50 to be housed thereinside. The tubular member 60 surrounds, for example, the outer circumferences of the electric wire members 20 and 50 over the entire circumference in the circumferential direction thereof. The tubular member 60 is, for example, harder than the insulating coatings 32, 42, and 52 of the electric wire members 20 and 50 (see FIGS. 2 and 3). Examples of the tubular member 60 include a metal pipe made of a metal and a resin pipe made of a resin. Examples of the material of the metal pipe include metal materials such as aluminum-based materials and copper-based materials. Examples of the material of the resin pipe include synthetic resins such as polyolefins, polyamides, polyesters, and ABS resins. The tubular member 60 of this embodiment is a metal pipe.

The tubular member 60 is bent, for example, two-dimensionally or three-dimensionally. The tubular member 60 includes a linear portion 63A that is located at the end portion 61 and extends linearly in the vehicle front-rear direction, a bent portion 64A (bend) that is provided at one end portion of the linear portion 63A, and a linear portion 63B that extends downward from the bent portion 64A in the vehicle vertical direction. The tubular member 60 includes a bent portion 64B that is provided at one end portion of the linear portion 63B, a linear portion 63C that extends rearward from the bent portion 64B in the vehicle front-rear direction, a bent portion 64C that is provided at one end portion of the linear portion 63C, and a linear portion 63D that extends upward from the bent portion 64C in the vehicle vertical direction.

For example, in the case of the wire harness 10, the bent portions 64A, 64B, and 64C are formed in the tubular member 60 by inserting linear electric wire members 20 and 50 into a linear tubular member 60 and then bending the tubular member 60 in which the electric wire members 20 and 50 are housed. At this time, the tubular member 60 and the electric wire members 20 and 50 inserted into the tubular member 60 are simultaneously bent. Also, in the case of the wire harness 10 of this embodiment, the bending process is started on the end portion 61 side in the longitudinal direction of the tubular member 60, and this bending process is sequentially performed toward the end portion 62. That is, the bent portions 64A, 64B, and 64C are formed in this order through the tubular member 60 bending process. Note that the bent portion 64A is the closest to the end portion 61 out of the plurality of bent portions 64A, 64B, and 64C.

As shown in FIG. 2, the linear portions 63A and 63B are respectively continuous with both sides of the bent portion 64A. The bent portion 64A is bent, for example, at a right angle. For example, the bent portion 64A is bent such that the direction in which the central axis of the linear portion 63A extends is orthogonal to the direction in which the central axis of the linear portion 63B extends. The bent portion 64A includes an inner bent part 65. Portions of the electric wire members 20 and 50 located inside the bent portion 64A are bent along the bent portion 64A.

The linear portion 63A is provided between an end surface 61A at the end portion 61 in the longitudinal direction of the tubular member 60 and the bent portion 64A. For example, the connection portions 22 of the electric wire members 20 are housed inside the linear portion 63A.

Configurations of Exterior Members 66 and 67

As shown in FIG. 1, the exterior members 66 and 67 have an elongated tubular shape. The exterior members 66 and 67 are provided, for example, at both end portions in the longitudinal direction of the wire harness 10. For example, the end portions in the longitudinal direction of the electric wire members 20 are housed inside the exterior members 66. For example, only the portions of the electric wire members 20 extending from the tubular member 60 out of the portions of the electric wire members 20 and 50 extending from the tubular member 60 are housed inside the exterior members 66. The exterior members 66 surround, for example, the outer circumferences of the flexible electric wires 30 in the longitudinal direction of the electric wire members 20 over the entire circumference in the circumferential direction thereof. For example, the end portions in the longitudinal direction of the electric wire members 50 are housed inside the exterior members 67. For example, only the portions of the electric wire members 50 extending from the tubular member 60 out of the portions of the electric wire members 20 and 50 extending from the tubular member 60 are housed inside the exterior members 67. The exterior members 67 surround, for example, the outer circumferences of the electric wire members 50 over the entire circumference in the circumferential direction thereof. Examples of the exterior members 66 and 67 include corrugated tubes and waterproof covers.

In the wire harness 10, the electric wire members 20 and 50 are housed in the tubular member 60 together, and the portions of the electric wire members 20 and the electric wire members 50 that extend outward from the tubular member 60 diverge from each other to different paths. The portions of the electric wire members 20 and the portions of the electric wire members 50 that diverge from each other to different paths are housed inside the exterior members 66 and the exterior members 67, respectively.

Configurations of Holders 70 and 80

The holder 70 is attached, for example, to the end portion 61, which is located on the side on which the bending process is started. The holder 80 is attached, for example, to the end portion 62, which is located on the side on which the bending process is finished. The holders 70 and 80 are respectively attached to the end portions 61 and 62 of the tubular member 60 in a state of being inserted into the tubular member 60. The holders 70 and 80 surround the outer circumferences of the electric wire members 20 and 50 that pass through the tubular member 60. The holders 70 and 80 are made of, for example, a synthetic resin. Examples of the material of the holders 70 and 80 include synthetic resins such as polyolefins, polyamides, polyesters, and ABS resins. For example, the holders 70 and 80 are arranged inside the tubular member 60 and thus protect the electric wire members 20 and 50 from the edges at the ends of the tubular member 60.

Configuration of Holder 70

Figure 4:
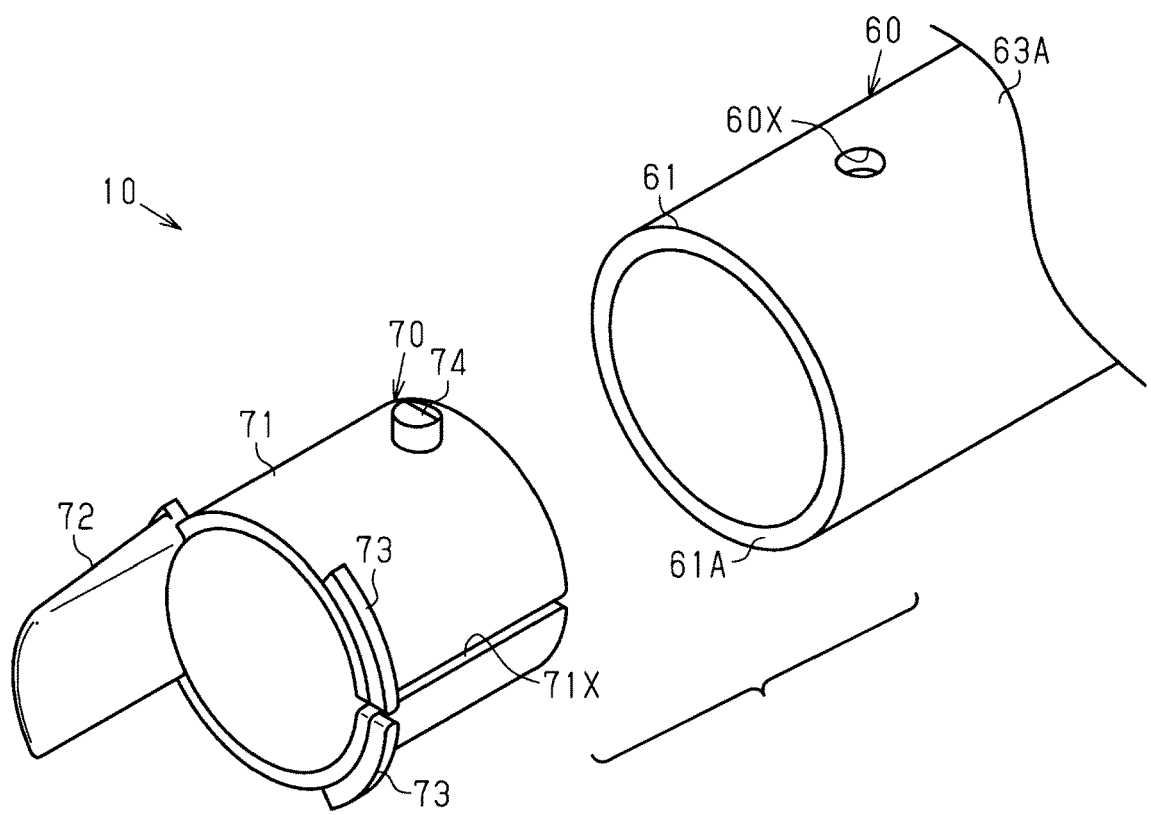
FIG. 4 is a schematic perspective view illustrating the wire harness of the embodiment.

As shown in FIG. 4, the holder 70 includes, for example, a tubular main body portion 71 (tubular main body), a fixation portion 72, protruding portions 73, and an engagement protrusion 74. The holder 70 is, for example, a unitary component obtained by forming the main body portion 71, the fixation portion 72, the protruding portions 73, and the engagement protrusion 74 as a single body.

The main body portion 71 is fitted into the tubular member 60. The main body portion 71 is formed, for example, in a tubular shape with an outer circumferential surface having a shape corresponding to the inner circumferential surface of the tubular member 60. The main body portion 71 of this embodiment is formed in a cylindrical tubular shape. The main body portion 71 has, for example, a C-shaped lateral cross section. The main body portion 71 is provided with a slit 71X that extends over the entire length in the axial direction of the main body portion 71.

As shown in FIG. 2, the main body portion 71 surrounds the outer circumferences of the electric wire members 20 and 50. The inner diameter of the main body portion 71 is set to, for example, a size that enables the two electric wire members 20 and the two electric wire members 50 to be housed thereinside. The main body portion 71 surrounds, for example, the outer circumferences of the flexible electric wires 30 in the longitudinal direction of the electric wire members 20. The main body portion 71 is provided at a position spaced apart from the connection portions 22 in the longitudinal direction of the electric wire members 20.

The fixation portion 72 protrudes from one end surface in the axial direction of the main body portion 71. The fixation portion 72 protrudes in a direction away from the main body portion 71. The fixation portion 72 is provided outside the tubular member 60. The fixation portion 72 is formed, for example, as a thin plate. As shown in FIG. 4, the fixation portion 72 is provided, for example, only to a portion in the circumferential direction of the main body portion 71. The fixation portion 72 is provided, for example, at a position different from that of the slit 71X in the circumferential direction of the main body portion 71.

The protruding portions 73 protrude, for example, outward in the radial direction of the main body portion 71 from the outer circumferential surface of the end portion that is continuous with the fixation portion 72 out of the end portions in the axial direction of the main body portion 71. The protruding portions 73 are provided, for example, to portions in the circumferential direction of the main body portion 71. The protruding portions 73 come into contact with, for example, the end surface 61A of the tubular member 60 in the axial direction of the main body portion 71.

The engagement protrusion 74 protrudes, for example, outward in the radial direction of the main body portion 71 from the outer circumferential surface of the main body portion 71. The engagement protrusion 74 is provided, for example, at a position spaced apart from the protruding portions 73 in the axial direction of the main body portion 71. The engagement protrusion 74 is provided, for example, only to a portion in the circumferential direction of the main body portion 71. The engagement protrusion 74 can be engaged with an engagement hole 60X provided in the tubular member 60. Here, the engagement hole 60X passes through the tubular member 60 in the thickness direction thereof. The holder 70 is fixed to the inner circumferential surface of the tubular member 60 as a result of the engagement protrusion 74 being engaged with the engagement hole 60X.

Configuration of Holder 80

The holder 80 shown in FIG. 1 has a structure similar to that of the holder 70, and therefore, a detailed description thereof is omitted. Note that the holder 80 of this embodiment does not include the fixation portion 72 shown in FIG. 4. That is, the holder 80 provided at the end portion 62, which is located on the side on which the bending process is finished, does not include the fixation portion 72.

Configurations of Fixing Members 90, 91, and 92

As shown in FIG. 2, the wire harness 10 includes fixing members 90, 91, and 92 for bundling the plurality of electric wire members 20 and the plurality of electric wire members 50. Each of the fixing members 90, 91, and 92 bundles the plurality of electric wire members 20 and 50 together, and fixes the arrangement (layout) of the plurality of electric wire members 20 and 50. Here, the arrangement of the plurality of electric wire members 20 and 50 means the relative positions (alignment positions) of the plurality of electric wire members 20 and the plurality of electric wire members 50 relative to one another on the lateral cross section including the electric wire members 20 and 50.

The fixing members 90, 91, and 92 are provided, for example, at intervals in the longitudinal direction of the tubular member 60. The fixing member 90 is provided, for example, between the connection portions 22 and the end surface 61A in the longitudinal direction of the tubular member 60. The fixing member 91 is provided, for example, between the connection portions 22 and the bent portion 64A in the longitudinal direction of the tubular member 60. The fixing member 92 is provided, for example, inside the linear portion 63B. The fixing member 91 and the fixing member 92 are respectively provided on both sides of the bent portion 64A in the longitudinal direction of the tubular member 60.

The fixing members 90, 91, and 92 are each formed, for example, by winding a tape member 93 around the plurality of electric wire members 20 and 50. The tape member 93 includes, for example, an adhesive layer on one surface thereof. The tape member 93 is wound onto the outer circumferential surfaces of the electric wire members 20 and 50, for example, in a state in which the adhesive layer faces the electric wire members 20 and 50. The tape member 93 is wound around the electric wire members 20 and 50, for example, a plurality of times. The tape member 93 fastens, for example, the electric wire members 20 and 50 in a direction in which these electric wire members approach each other.

Note that, although not illustrated, a plurality of fixing members for bundling the electric wire members 20 and 50 are also provided at intervals in the longitudinal direction of the tubular member 60 inside the linear portions 63C and 63D and the bent portions 64B and 64C shown in FIG. 1.

Configuration of Fixing Member 95

As shown in FIG. 2, the wire harness 10 includes a fixing member 95 for fixing the plurality of electric wire members 20 and the plurality of electric wire members 50 to the holder 70. The fixing member 95 fixes, for example, the plurality of electric wire members 20 and 50 to the fixation portion 72 of the holder 70.

Arrangement of Electric Wire Members 20 and 50

Next, the arrangement of the electric wire members 20 and 50 inside the tubular member 60 will be described.

First, the arrangement of the electric wire members 20 and 50 at the bent portion 64A will be described with reference to FIG. 5. The hard electric wires 40 in the longitudinal direction of the electric wire members 20 are routed at the bent portion 64A.

Figure 5:
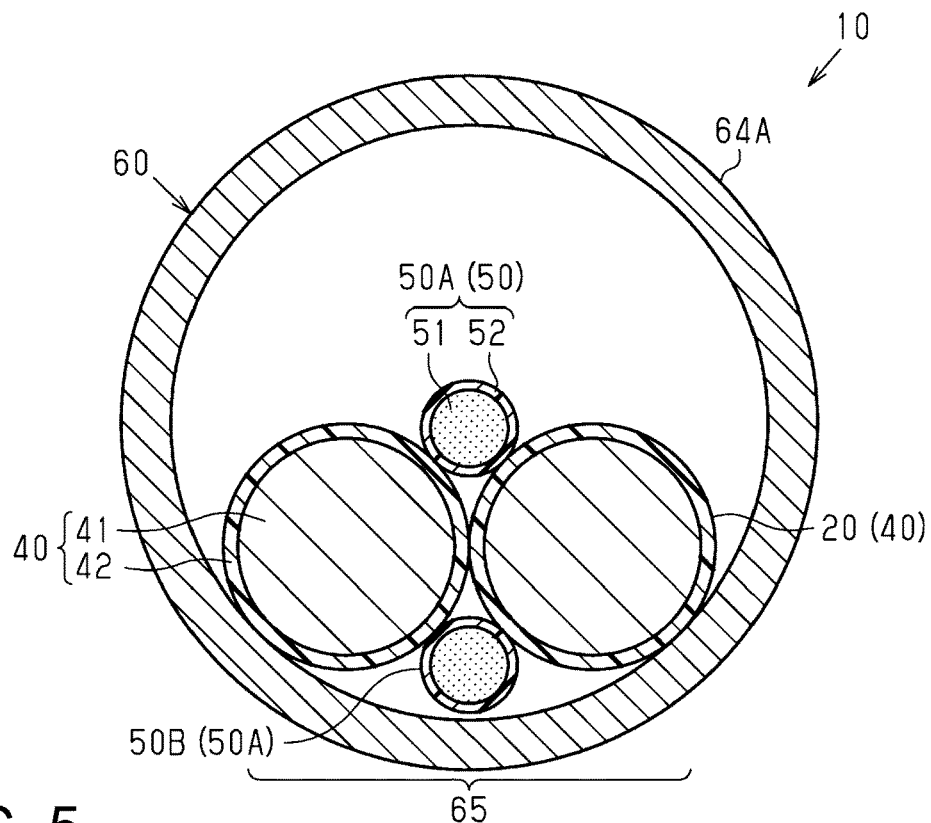
FIG. 5 is a schematic lateral cross-sectional view illustrating the wire harness of the embodiment (a cross-sectional view taken along line 5-5 in FIG. 2).

As shown in FIG. 5, in the bent portion 64A, the two hard electric wires 40 are lined up in a first direction (the left-right direction in the diagram here) that intersects the longitudinal direction of the electric wire members 20. At the bent portion 64A, the two flexible electric wires 50A are lined up in a second direction (the vertical direction in the diagram here) that intersects the first direction in which the two hard electric wires 40 are lined up. The two flexible electric wires 50A are lined up in the second direction in a state in which the two hard electric wires 40 are located therebetween. Note that the arrangement of the electric wire members 20 and 50 as described above may also be referred to as a "first arrangement" for illustrative purposes.

Subsequently, the first arrangement of the electric wire members 20 and 50 will be described in more detail.

The two hard electric wires 40 are, for example, in external contact with each other. That is, the outer circumferential surfaces of the insulating coatings 42 of the two hard electric wires 40 are in contact with each other at one point in the circumferential directions of the hard electric wires 40. The flexible electric wires 50A are provided in gaps formed between the outer circumferences of the two hard electric wires 40. For example, the two flexible electric wires 50A are respectively provided in two gaps formed between the outer circumferences of the two hard electric wires 40. Each of the flexible electric wires 50A is, for example, in external contact with the two hard electric wires 40. For example, each of the flexible electric wires 50A is provided in a gap formed between the two hard electric wires 40 such that the outer circumferential surface of the insulating coating 52 is in contact with the outer circumferential surfaces of the two hard electric wires 40.

Next, the arrangement of the electric wire members 20 and 50 relative to the tubular member 60 will be described.

At the bent portion 64A, the hard electric wires 40 and the flexible electric wires 50A are located closer to the inner bent part 65 of the bent portion 64A than the outer bent part thereof. The two hard electric wires 40 are, for example, in internal contact with the tubular member 60. The two hard electric wires 40 are, for example, in contact with the inner surface of the inner bent part 65. For example, the outer circumferential surface of the insulating coating 42 of each of the two hard electric wires 40 is in contact with the inner surface of the inner bent part 65 at one point in the circumferential direction of the tubular member 60. The hard electric wires 40 are, for example, in external contact with each other and in internal contact with the tubular member 60.

Each of the two flexible electric wires 50A is provided in a space surrounded by the outer circumferential surfaces of the two hard electric wires 40 and the inner circumferential surface of the tubular member 60. One of the two flexible electric wires 50A that is provided closer to the inner bent part 65 is provided in a space surrounded by the inner surface of the inner bent part 65 and portions of the outer circumferential surfaces of the two hard electric wires 40 that are opposed to the inner bent part 65. In the following description, one of the two flexible electric wires 50A that is provided at a position closer to the inner bent part 65 is referred to as a "flexible electric wire 50B" for illustrative purposes. The flexible electric wire 50B is spaced apart from the outer circumferential surfaces of the hard electric wires 40 and/or the inner surface of the inner bent part 65. When the flexible electric wire 50B is in contact with, for example, the outer circumferential surface of the hard electric wire 40, the flexible electric wire 50B is spaced apart from the inner circumferential surface of the tubular member 60. When the flexible electric wire 50B is in contact with, for example, the inner circumferential surface of the tubular member 60, the flexible electric wire 50B is spaced apart from the outer circumferential surfaces of the hard electric wires 40. In the example shown in FIG. 5, the flexible electric wire 50B is in external contact with the two hard electric wires 40 and is spaced apart from the inner surface of the inner bent part 65. The outer diameter of the flexible electric wire 50B is set to, for example, such a size that enables the flexible electric wire 50B to be spaced apart from the outer circumferential surfaces of the hard electric wires 40 and/or the inner surface of the inner bent part 65. The following is a detailed description of the outer diameter of the flexible electric wire 50B.

Figure 6:
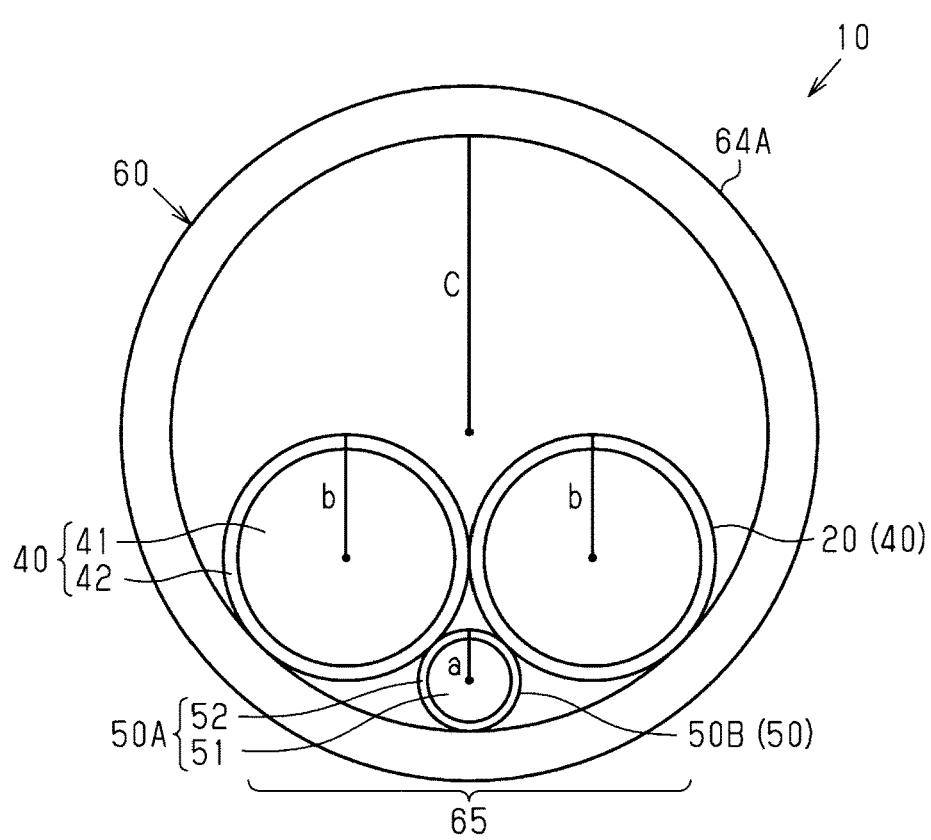
FIG. 6 is an explanatory diagram illustrating the relationship between the outer diameters of electric wire members and the inner diameter of a tubular member.

The following is a description of a case where two hard electric wires 40 and one flexible electric wire 50B are in external contact with one another, and all of the two hard electric wires 40 and the one flexible electric wire 50B are in internal contact with the tubular member 60 as shown in FIG. 6. When the radius of the outer circumference of the flexible electric wire 50B is defined as a, the two hard electric wires 40 have the same outer diameter, the radius of the outer circumference of each of the hard electric wires 40 is defined as b, and the radius of the inner circumference of the tubular member 60 is defined as c, Formula 1 below is satisfied (Descartes' Circle Theorem). Note that, in FIG. 6, only the flexible electric wire 50B of the two flexible electric wires 50A is shown and the members are not hatched to simplify the diagram.

[Mathematical Formula 1]

$$\left(\frac{1}{a}+\frac{1}{b}+\frac{1}{b}-\frac{1}{c}\right)^2 = 2\left(\frac{1}{a^2}+\frac{1}{b^2}+\frac{1}{b^2}+\frac{1}{c^2}\right) \quad \text{(Formula 1)}$$

$$\left(\frac{1}{a}+\frac{2}{b}-\frac{1}{c}\right)^2 = 2\left(\frac{1}{a^2}+\frac{2}{b^2}+\frac{1}{c^2}\right)$$

When Formula 1 above is satisfied, the flexible electric wire 50B is in contact with the outer circumferential surfaces of the two hard electric wires 40 and is in contact with the inner circumferential surface of the tubular member 60. Accordingly, when Formula 1 above is satisfied, the flexible electric wire 50B may be compressed between the outer circumferential surfaces of the two hard electric wires 40 and the inner circumferential surface of the tubular member 60. Therefore, in this embodiment, the radius of the outer circumference of the flexible electric wire 50B is set to a value smaller than the radius a that satisfies Formula 1 above. By setting the radius of the outer circumference of the flexible electric wire 50B as described above, the flexible electric wire 50B can be spaced apart from the outer circumferential surfaces of the hard electric wires 40 and/or the inner circumferential surface of the tubular member 60 as shown in FIG. 5. Accordingly, it is possible to keep the flexible electric wire 50B from being compressed between the outer circumferential surfaces of the two hard electric wires 40 and the inner circumferential surface of the tubular member 60.

At the bent portion 64A, the lateral cross-sectional shape of the hard electric wires 40, the lateral cross-sectional shape of the flexible electric wire 50B, and the lateral cross-sectional shape of the tubular member 60 may be slightly changed from a perfect circle to an elliptical shape or the like due to the bending process or the like. However, even in such a case, the lateral cross-sectional shape of the hard electric wires 40, the lateral cross-sectional shape of the flexible electric wire 50B and the lateral cross-sectional shape of the tubular member 60 are considered an unchanged perfect circle in Formula 1 above.

Note that, in the wire harness 10, the arrangement of the electric wire members 20 and 50 is the first arrangement in at least the bent portion 64A out of the plurality of bent portions 64A, 64B, and 64C shown in FIG. 1. It is preferable that the arrangement of the electric wire members 20 and 50 is also the first arrangement at the bent portions 64B and 64C. However, the arrangement of the electric wire members 20 and 50 need not necessarily be the first arrangement at the bent portions 64B and 64C.

Next, the arrangement of the electric wire members 20 and 50 at a position of the linear portion 63A that is close to the bent portion 64A will be described with reference to FIGS. 2 and 3. FIG. 3 shows the lateral cross-sectional shapes of the electric wire members 20 and 50, the tubular member 60, and the fixing member 91 at the position at which the fixing member 91 is provided.

As shown in FIG. 3, the arrangement of the two hard electric wires 40 and the two flexible electric wires 50A is the first arrangement as in the case of the bent portion 64A shown in FIG. 5. In this embodiment, the two hard electric wires 40 are in external contact with each other, and each of the flexible electric wires 50A is in external contact with the two hard electric wires 40. The two hard electric wires 40 and the two flexible electric wires 50A are bundled using, for example, the tape member 93 constituting the fixing member 91. Thus, the arrangement of the two hard electric wires 40 and the two flexible electric wires 50A is kept as the first arrangement. The hard electric wires 40 and the flexible electric wires 50A bundled together using the fixing member 91 are arranged, for example, at the central portion in the radial direction of the tubular member 60. At this time, the outer circumferential surface of the fixing member 91, the outer circumferential surfaces of the hard electric wires 40, and the outer circumferential surfaces of the flexible electric wires 50A are not in contact with, for example, the inner circumferential surface of the tubular member 60.

The arrangement of the two hard electric wires 40 and the two flexible electric wires 50A is the first arrangement in the linear portion 63B shown in FIG. 2 as in the case shown in FIG. 3. The arrangement of the two hard electric wires 40 and the two flexible electric wires 50A is kept as the first arrangement by the fixing member 92. Thus, the arrangement of the electric wire members 20 and 50 is kept as the first arrangement between the fixing member 91 and the fixing member 92. Accordingly, the arrangement of the electric wire members 20 and 50 is kept as the first arrangement inside the bent portion 64A provided between the fixing member 91 and the fixing member 92.

Figure 7:
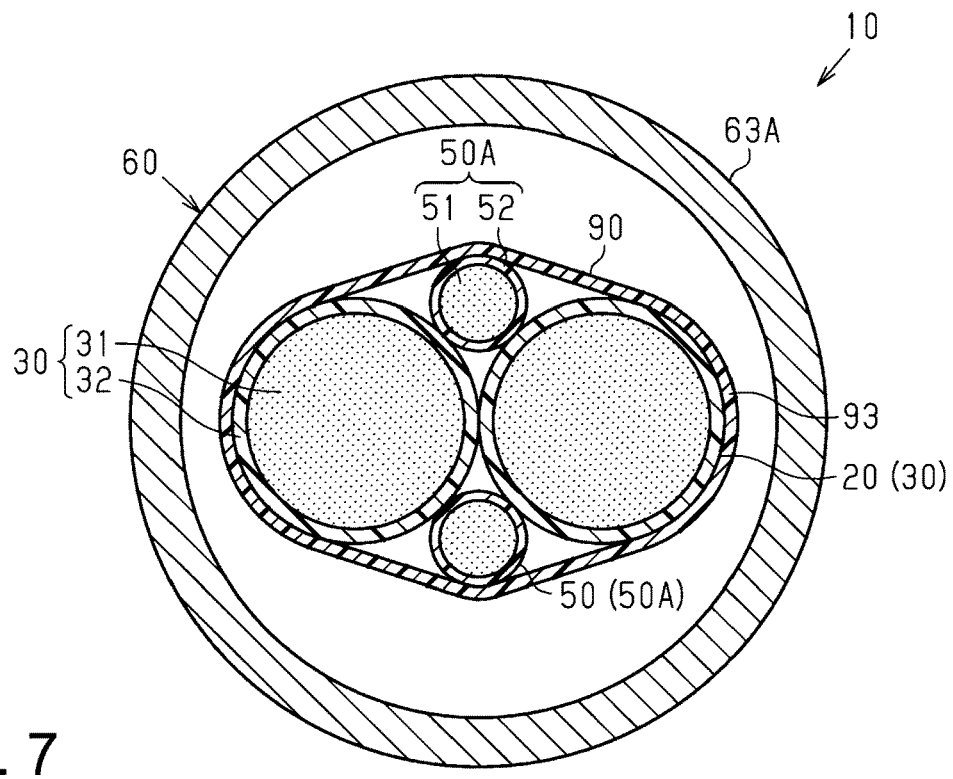
FIG. 7 is a schematic lateral cross-sectional view illustrating the wire harness of the embodiment (a cross-sectional view taken along line 7-7 in FIG. 2).

Next, the arrangement of the electric wire members 20 and 50 at the position in the longitudinal direction of the linear portion 63A at which the fixing member 90 is provided will be described. The flexible electric wires 30 in the longitudinal direction of the electric wire members 20 are routed in the portion provided with the fixing member 90. FIG. 7 shows the lateral cross-sectional shapes of the electric wire members 20 and 50, the tubular member 60, and the fixing member 90 at the position at which the fixing member 90 is provided.

As shown in FIG. 7, the arrangement of the two electric wire members 20 and the two electric wire members 50 is the first arrangement as in the case of the bent portion 64A shown in FIG. 5. In this embodiment, the two flexible electric wires 30 are in external contact with each other, and each of the flexible electric wires 50A is in external contact with the two flexible electric wires 30. The two flexible electric wires 30 and the two flexible electric wires 50A are bundled using, for example, the tape member 93 constituting the fixing member 90. Thus, the arrangement of the two flexible electric wires 30 and the two flexible electric wires 50A is kept as the first arrangement.

Next, the arrangement of the electric wire members 20 and 50 at a position P1 shown in FIG. 2 that is located outside the tubular member 60 will be described. The position P1 is located, for example, at a portion in the longitudinal direction of the electric wire members 20 and 50 that overlaps the fixation portion 72 of the holder 70 and the fixing member 95. The flexible electric wires 30 in the longitudinal direction of the electric wire members 20 are routed at the position P1.

Figure 8:
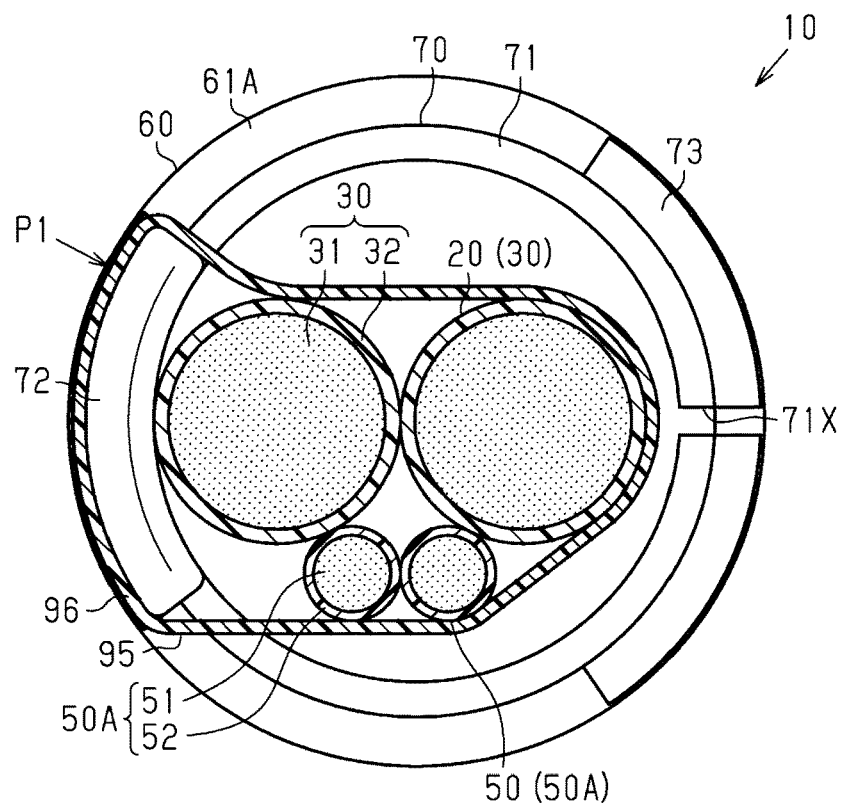
FIG. 8 is a schematic lateral cross-sectional view illustrating the wire harness of the embodiment (a cross-sectional view taken along line 8-8 in FIG. 2).

As shown in FIG. 8, at the position P1, the two flexible electric wires 30 are lined up in a third direction (the left-right direction in the diagram here) that intersects the longitudinal direction of the electric wire members 20. At the position P1, the two flexible electric wires 50A are lined up in a state in which the two flexible electric wires 30 are not located therebetween. In this embodiment, the third direction in which the two flexible electric wires 30 are lined up is in parallel with the first direction in which the two hard electric wires 40 are lined up at the bent portion 64A shown in FIG. 5. Note that the arrangement of the electric wire members 20 and 50 as described above may also be referred to as "second arrangement" for illustrative purposes.

Subsequently, the second arrangement of the electric wire members 20 and 50 will be described in more detail.

The two flexible electric wires 30 are, for example, in external contact with each other. That is, the outer circumferential surfaces of the insulating coatings 32 of the two flexible electric wires 30 are in contact with each other at one point in the circumferential directions of the flexible electric wires 30. The two flexible electric wires 50A are collectively provided, for example, in one of two gaps formed between the outer circumferences of the two flexible electric wires 30. The two flexible electric wires 50A are lined up, for example, in a direction that is in parallel with the third direction in which the two flexible electric wires 30 are lined up. The two flexible electric wires 50A are, for example, in external contact with each other. That is, the outer circumferential surfaces of the insulating coatings 52 of the two flexible electric wires 50A are in contact with each other at one point in the circumferential directions of the flexible electric wires 50A. Each of the flexible electric wires 50A is, for example, in external contact with only one of the two flexible electric wires 30. That is, one of the flexible electric wires 50A is in external contact with one of the flexible electric wires 30, and the other of the flexible electric wires 50A is in external contact with the other of the flexible electric wires 30.

Next, the arrangement of the electric wire members 20 and 50 relative to the holder 70 will be described.

The two flexible electric wires 30 overlap, for example, the fixation portion 72 of the holder 70 in the radial direction of the main body portion 71. For example, the two flexible electric wires 30 overlap a straight line extending from the fixation portion 72 in the radial direction of the main body portion 71 (the left-right direction in the diagram here). For example, only one of the two flexible electric wires 30 is in contact with the inner surface of the fixation portion 72. The two flexible electric wires 50A are provided, for example, at a position where they are not sandwiched between the fixation portion 72 and the two flexible electric wires 30 and are spaced apart from the fixation portion 72. The two flexible electric wires 50A are provided, for example, at a position at which they are not in contact with the fixation portion 72. The two flexible electric wires 50A are lined up, for example, along a straight line that is in parallel with the straight line extending from the fixation portion 72 in the radial direction of the main body portion 71.

At the position P1, the two flexible electric wires 30 and the two flexible electric wires 50A are bundled using the fixing member 95 and fixed to the fixation portion 72 using the fixing member 95. The fixing member 95 is formed, for example, by winding a tape member 96 around the fixation portion 72 and the plurality of flexible electric wires 30 and 50A. The tape member 96 includes, for example, an adhesive layer on one surface thereof. The tape member 96 is wound onto the outer surface of the fixation portion 72 and the outer circumferential surfaces of the flexible electric wires 30 and 50A, for example, in a state in which the adhesive layer faces inward in the radial direction of the main body portion 71. The tape member 96 is wound around the fixation portion 72 and the flexible electric wires 30 and 50A, for example, a plurality of times. The tape member 96 fastens, for example, the fixation portion 72 and the flexible electric wires 30 and 50A in a direction in which they approach each other. The two flexible electric wires 30, the two flexible electric wires 50A, and the fixation portion 72 are bundled together using this tape member 96. Thus, at the position P1, the arrangement of the two flexible electric wires 30 and the two flexible electric wires 50A is kept as the second arrangement, and the arrangement of the flexible electric wires 30 and 50A relative to the fixation portion 72 is fixed.

As shown in FIG. 2, the electric wire members 20 and 50 are rearranged such that the arrangement of the electric wire members 20 and 50 is changed from the first arrangement to the second arrangement in the region between the bent portion 64A and the position P1 in the longitudinal direction of the electric wire members 20 and 50. In other words, the electric wire members 20 and 50 are rearranged such that the arrangement of the electric wire members 20 and 50 is changed from the second arrangement to the first arrangement in the region between the position P1 and the bent portion 64A in the longitudinal direction of the electric wire members 20 and 50. The arrangement of the electric wire members 20 and 50 is changed, for example, in the region between the connection portion 22 and the position P1 in the longitudinal direction of the electric wire members 20 and 50. The arrangement of the electric wire members 20 and 50 is changed, for example, in the region between the fixing member 90 and the position P1 in the longitudinal direction of the electric wire members 20 and 50.

Figure 9:
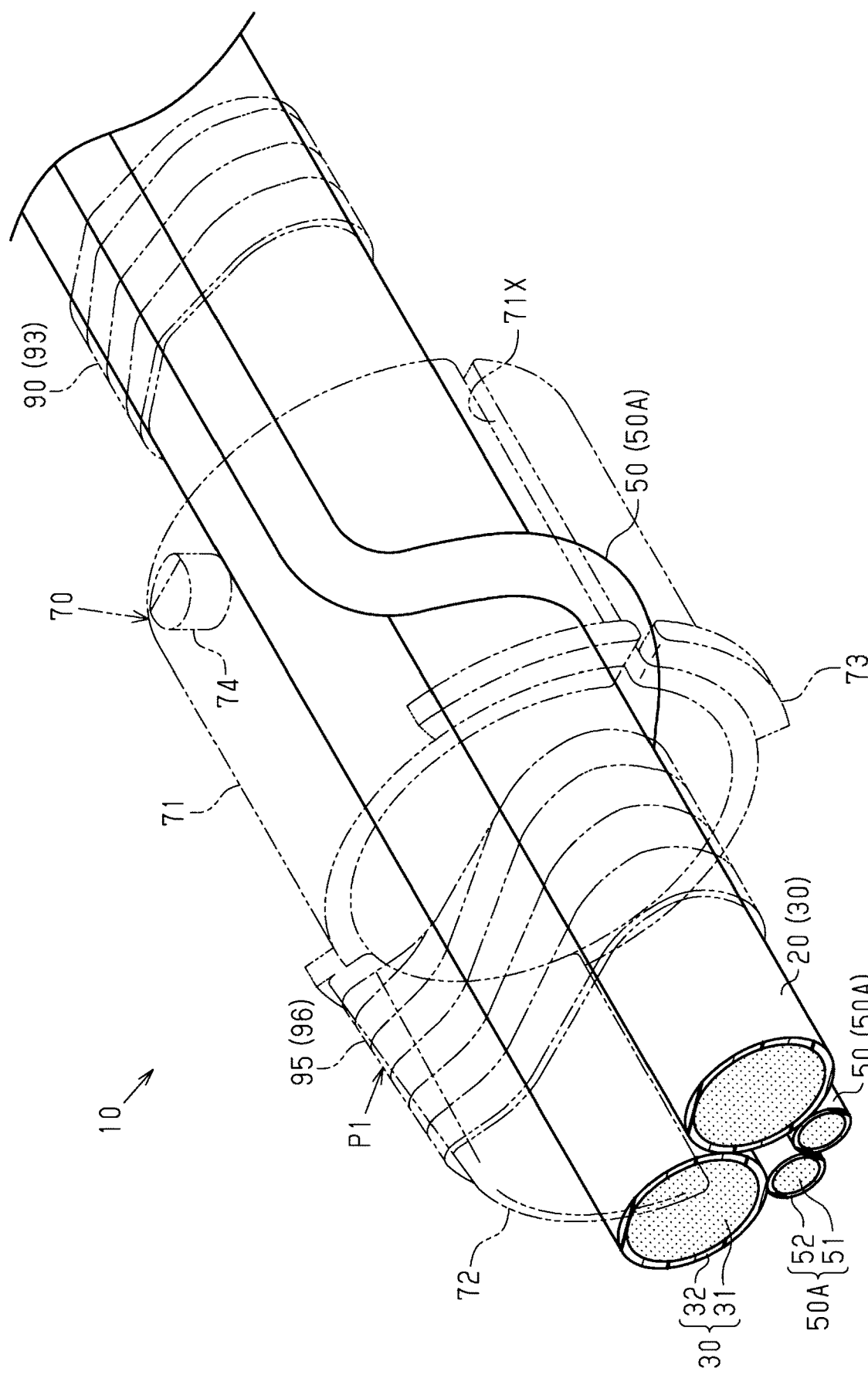
FIG. 9 is a schematic perspective view illustrating the wire harness of the embodiment.

As shown in FIG. 9, in the wire harness 10 of this embodiment, one of the two electric wire members 50 is rearranged such that the arrangement of the electric wire members 20 and 50 is changed from the first arrangement to the second arrangement in the region between the fixing member 90 and the position P1. That is, in the wire harness 10 of this embodiment, the arrangement of the electric wire members 20 and 50 is changed by rearranging one electric wire member 50.

In the wire harness 10, one electric wire member 50 arranged in one of the two gaps formed between the two electric wire members 20 is rearranged to move to the other gap in the region between the fixing member 90 and the position P1. In the example shown in the diagram, one electric wire member 50 that is arranged on the upper side of the two electric wire members 20 near the fixing member 90 is rearranged to move to the lower side of the two electric wire members 20 in the region between the fixing member 90 and the position P1. In this embodiment, one electric wire member 50 is rearranged inside the main body portion 71 of the holder 70. In this embodiment, one electric wire member 50 is rearranged using the fixing member 90 as a fixation point. One electric wire member 50 is rearranged while being twisted, for example, using the fixing member 90 as a fixation point. One electric wire member 50 is rearranged from the upper side of the two electric wire members 20 toward the lower side thereof while extending, for example, along the outer circumferential surface of one of the two electric wire members 20. For example, one electric wire member 50 is rearranged from the upper side of the two electric wire members 20 toward the lower side thereof while extending along the outer circumferential surface of one of the two electric wire members 20 that is farther away from the fixation portion 72. For example, one electric wire member 50 is rearranged from the upper side of the two electric wire members 20 toward the lower side thereof while extending, for example, along a portion of the outer circumferential surface of one electric wire member 20 that is farther away from the other electric wire member 20 and the fixation portion 72. That is, one electric wire member 50 is rearranged in the space that where it is not sandwiched between the electric wire member 20 and the fixation portion 72.

The following is a description of the functions and effects of this embodiment.

(1) Inside the bent portion 64A, the plurality of electric wire members 20 are lined up in the first direction, and the plurality of electric wire members 50 are lined up in a state in which the plurality of electric wire members 20 are located therebetween. For example, the plurality of electric wire members 50 are respectively provided in a plurality of gaps formed between the outer circumferences of the plurality of electric wire members 20. Accordingly, if two electric wire members 20 are in contact with the inner surface of the inner bent part 65 of the bent portion 64A, and a space is formed between the outer circumferential surfaces of the two electric wire members 20 and the inner surface of the inner bent part 65, for example, only one of the plurality of electric wire members 50 will be arranged in this space. Thus, it is possible to keep the electric wire members 50 from being compressed by the outer circumferential surfaces of the electric wire members 20 and the inner surface of the inner bent part 65 compared with a configuration in which the plurality of electric wire members 50 are arranged in the space between the outer circumferential surfaces of the two electric wire members 20 and the inner surface of the inner bent part 65. As a result, it is possible to suppress damage to the insulating coatings 42 of the electric wire members 20 and the insulating coatings 52 of the electric wire members 50. Accordingly, it is possible to suppress a decrease in the insulation reliability of the electric wire members 20 and 50.

(2) The two flexible electric wires 50A are respectively provided in two gaps formed between the outer circumferences of the two hard electric wires 40 inside the bent portion 64A. Accordingly, it is possible to keep the flexible electric wires 50A from being compressed between the outer circumferential surfaces of the hard electric wires 40, which have high flexural rigidity, and the inner circumferential surface of the hard tubular member 60. Also, it is possible to keep the flexible electric wires 50A from being compressed by the two hard electric wires 40. As a result, it is possible to favorably suppress damage to the insulating coatings 42 of the hard electric wires 40 and the insulating coatings 52 of the flexible electric wires 50A.

(3) At the position P1 located outside the tubular member 60, the plurality of electric wire members 20 are lined up in the third direction, and the plurality of electric wire members 50 are lined up in a state in which the plurality of electric wire members 20 are not located therebetween. For example, the plurality of electric wire members 50 are collectively provided in one of a plurality of gaps formed between the outer circumferences of the plurality of electric wire members 20. Thus, at the position P1, the plurality of electric wire members 20 are collectively arranged, while the plurality of electric wire members 50 are collectively arranged. Accordingly, if the plurality of electric wire members 20 and the plurality of electric wire members 50 diverge from each other into different paths outside the tubular member 60, for example, the divergence of the plurality of electric wire members 20 and the plurality of electric wire members 50 can be easily achieved. Thus, it is possible to make the routing of the wire harness 10 outside the tubular member 60 easier.

(4) At the position P1, the plurality of electric wire members 50 are lined up at a position where they are not sandwiched between the fixation portion 72 of the holder 70 and the electric wire members 20 and are spaced apart from the fixation portion 72. Thus, the plurality of electric wire members 50 are not sandwiched between the fixation portion 72 and the electric wire members 20, thus making it possible to easily branch the electric wire members 50 from the electric wire members 20. Moreover, it is possible to favorably keep the electric wire members 50 from being compressed between the electric wire members 20 and the fixation portion 72, thus making it possible to suppress damage to the insulating coatings 32 of the electric wire members 20 and the insulating coatings 52 of the electric wire members 50.

(5) The arrangement of the electric wire members 20 and 50 is changed from the first arrangement to the second arrangement by rearranging one of the two electric wire members 50. With this configuration, it is possible to change the arrangement of the electric wire members 20 and 50 by rearranging the electric wire member 50 that includes a single flexible electric wire 50A. Accordingly, unlike a configuration in which the electric wire member 20 that includes the connection portion 22 is rearranged, it is possible to favorably suppress breaking of the electric wire member 50 even when the electric wire member 50 is rearranged while being twisted.

(6) The fixing member 90 for keeping the arrangement of the electric wire members 20 and 50 as the first arrangement is provided between the connection portions 22 and the position P1. Moreover, the electric wire member 50 is rearranged such that the arrangement of the electric wire members 20 and 50 is changed from the first arrangement to the second arrangement in the region between the fixing member 90 and the position P1. With this configuration, it is possible to favorably rearrange the electric wire member 50 using the fixing member 90 as a fixation point. For example, the arrangement of the electric wire members 20 and 50 are fixed as the first arrangement by the fixing member 90, and therefore, even when the electric wire member 50 is rearranged, it is possible to favorably keep the arrangement of the electric wire members 20 and 50 as the first arrangement in the region located on the fixing member 91 side with respect to the fixing member 90.

Other Embodiments

The embodiment mentioned above can be implemented with various modifications as follows. The embodiment mentioned above and the following modified examples can be implemented in combination with each other as long as they are technically compatible with each other.

In the embodiment mentioned above, at the position P1, the two electric wire members 20 overlap a straight line extending from the fixation portion 72 in the radial direction of the main body portion 71. However, there is no limitation to this configuration.

Figure 10:
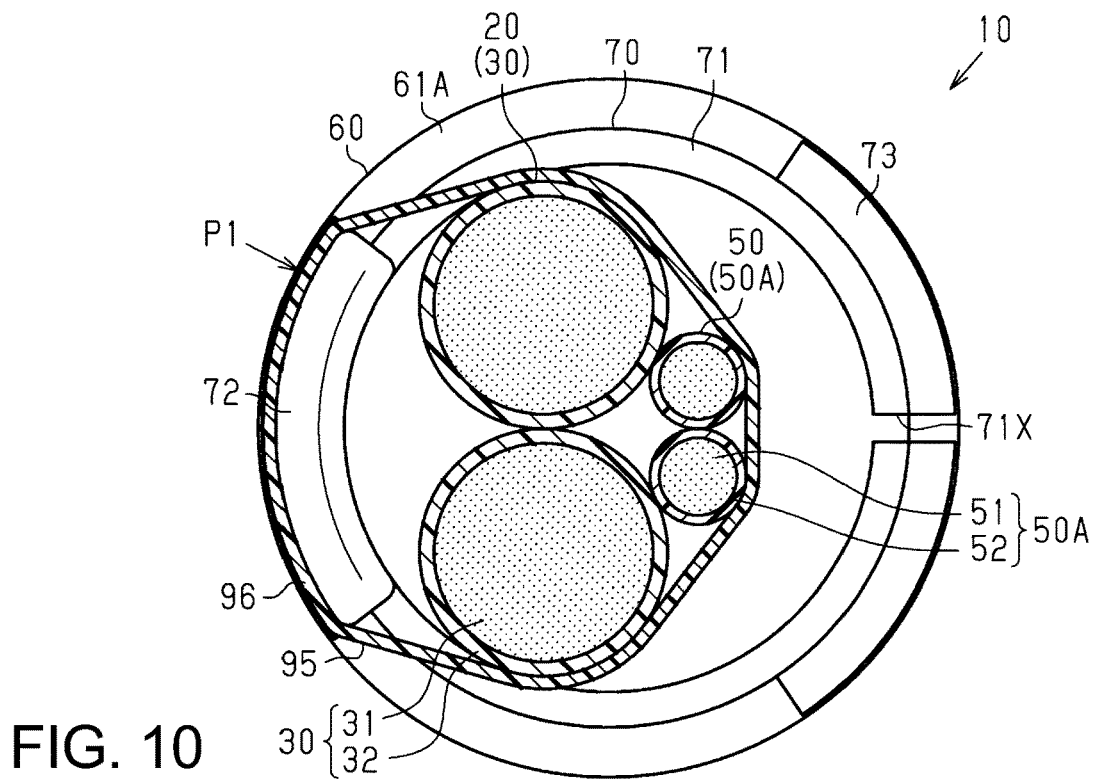
FIG. 10 is a schematic lateral cross-sectional view illustrating a wire harness of a modified example.

For example, as shown in FIG. 10, the two electric wire members 20 may also be arranged such that the two electric wire members 20 are lined up laterally relative to the fixation portion 72 at the position P1. That is, the two electric wire members 20 may also be lined up on a straight line that is orthogonal to the straight line extending from the fixation portion 72 in the radial direction of the main body portion 71 (the left-right direction in the diagram here). In this case, the two electric wire members 50 are provided, for example, on the side opposite to the fixation portion 72 with the two electric wire members 20 being located therebetween. That is, the two electric wire members 20 are located between the two electric wire members 50 and the fixation portion 72. The two electric wire members 50 are lined up, for example, in a direction that is in parallel with the direction in which the two electric wire members 20 are lined up (the vertical direction in the diagram). Note that the two electric wire members 50 may also be lined up in a direction (e.g., the left-right direction in the diagram) that intersects the direction in which the two electric wire members 20 are lined up.

Figure 11:
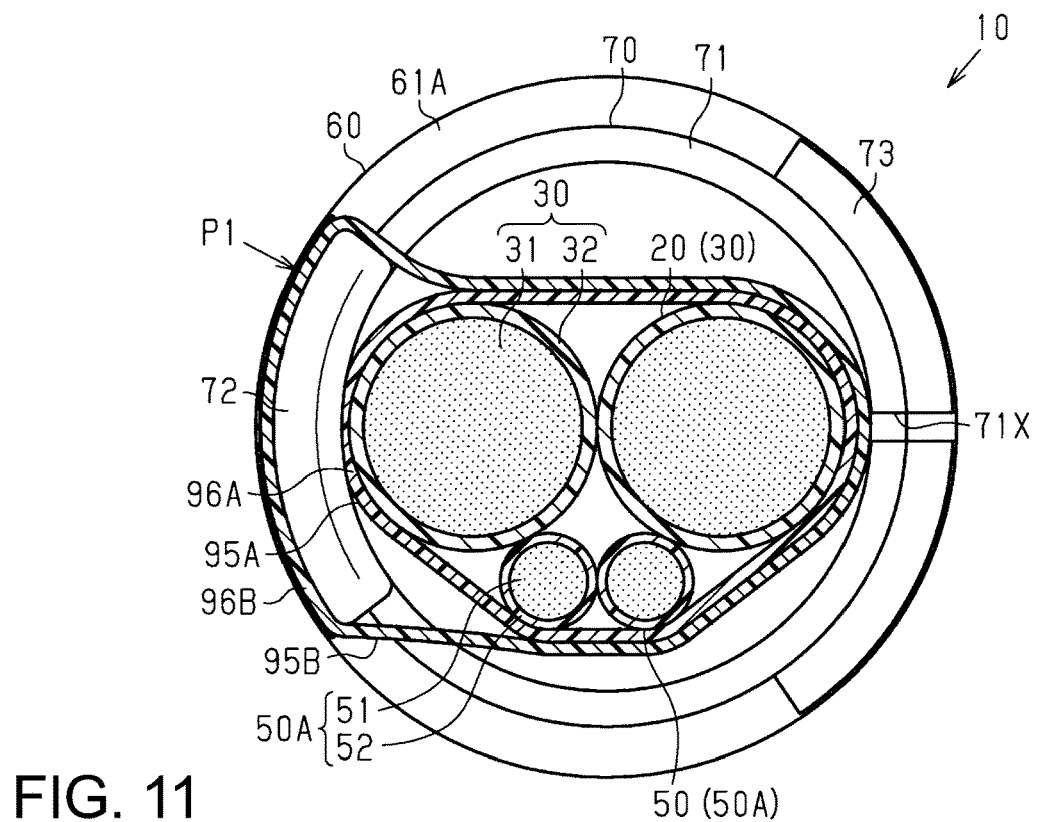
FIG. 11 is a schematic lateral cross-sectional view illustrating a wire harness of a modified example.

As shown in FIG. 11, a fixing member 95A for bundling the two electric wire members 20 and the two electric wire members 50 at the position P1 and a fixing member 95B for fixing the two electric wire members 20 and the two electric wire members 50 to the fixation portion 72 at the position P1 may be separately provided. In this case, the two flexible electric wires 30 and the two flexible electric wires 50A are bundled together, for example, by winding a tape member 96A constituting the fixing member 95A onto the outer circumferences of the two flexible electric wires 30 and the outer circumferences of the two flexible electric wires 50A. Thus, the arrangement of the flexible electric wires 30 and 50A is kept as the second arrangement. Furthermore, the flexible electric wires 30 and 50A bundled together using the fixing member 95A are fixed to the fixation portion 72 by winding a tape member 96B constituting the fixing member 95B onto the outer circumference of the fixing member 95A and the outer circumference of the fixation portion 72.

In the embodiment mentioned above, the electric wire members 20 and the electric wire members 50 are collectively fixed to the fixation portion 72 of the holder 70, but there is no limitation to this configuration. For example, the electric wire members 20 and the electric wire members 50 may be separately fixed to the holder 70.

Figure 12:
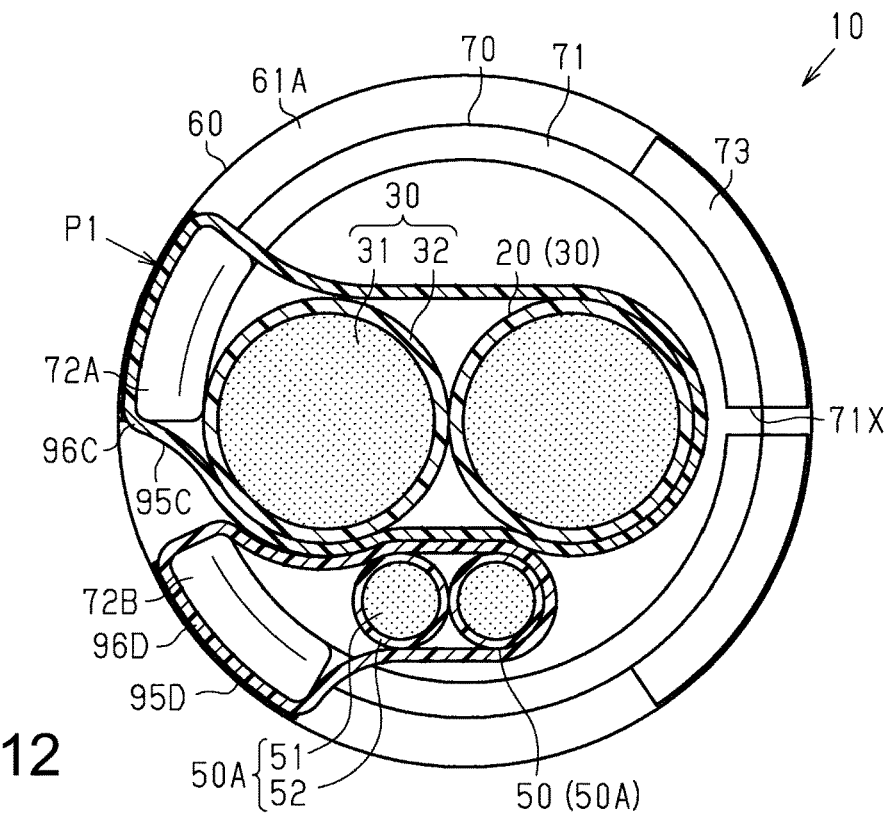
FIG. 12 is a schematic lateral cross-sectional view illustrating a wire harness of a modified example.

For example, as shown in FIG. 12, a configuration may also be employed in which the holder 70 is provided with two fixation portions 72A and 72B, the two electric wire members 20 are fixed to one of the fixation portions (fixation portion 72A here) using a fixing member 95C, and the two electric wire members 50 are fixed to the other of the fixation portions (fixation portion 72B here) using a fixing member 95D. The two fixation portions 72A and 72B are provided, for example, at positions that are spaced apart from each other in the circumferential direction of the main body portion 71. For example, the two electric wire members 20 are fixed to the fixation portion 72A by winding a tape member 96C constituting the fixing member 95C onto the outer circumferences of the two electric wire members 20 and the outer circumference of the fixation portion 72A. For example, the two electric wire members 50 are fixed to the fixation portion 72B by winding a tape member 96D constituting the fixing member 95D onto the outer circumferences of the two electric wire members 50 and the outer circumference of the fixation portion 72B.

In the second arrangement of the embodiment mentioned above, the two electric wire members 50 are lined up in a direction that is in parallel with the third direction in which the two electric wire members 20 are lined up, but there is no limitation to this configuration.

Figure 13:
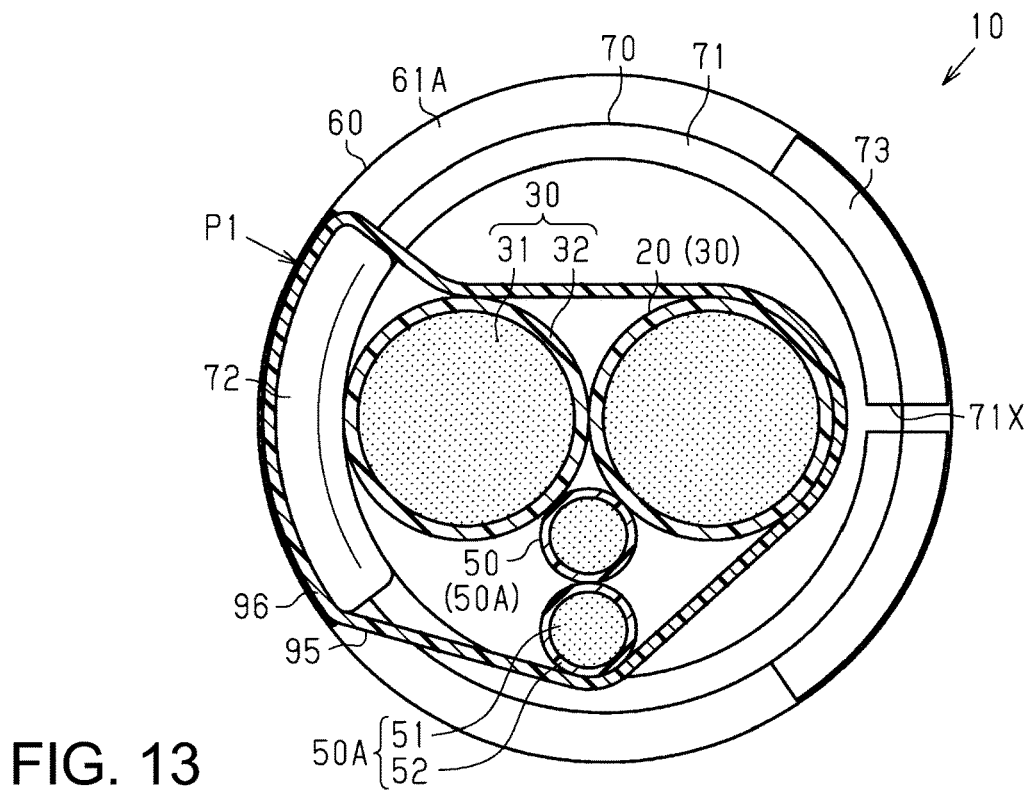
FIG. 13 is a schematic lateral cross-sectional view illustrating a wire harness of a modified example.

For example, in the second arrangement, as shown in FIG. 13, the two electric wire members 50 may also be lined up in a direction (the vertical direction in the diagram here) that intersects the third direction (the left-right direction in the diagram here) in which the two electric wire members 20 are lined up. Also in this case, in the second arrangement, the two electric wire members 20 are not located between the two electric wire members 50.

In the second arrangement of the embodiment mentioned above, the two electric wire members 50 are provided in a gap formed between the outer circumferences of the two electric wire members 20, but there is no limitation to this configuration. For example, in the second arrangement, the two electric wire members 50 may also be lined up near a portion of the outer circumferential surface of one electric wire member 20 that is the farthest from the other electric wire member 20. In this case, the two electric wire members 50 are provided, for example, on the side opposite to the other electric wire member 20 with the one electric wire member 20 being located therebetween. Also in this case, the two electric wire members 50 are lined up in the state in which the two electric wire members 20 are located therebetween.

In the embodiment mentioned above, the arrangement of the electric wire members 20 and 50 is changed from the first arrangement to the second arrangement by rearranging one of the two electric wire members 50. However, there is no limitation to this configuration. For example, the arrangement of the electric wire members 20 and 50 may also be changed from the first arrangement to the second arrangement by rearranging both of the two electric wire members 50.

In the embodiment mentioned above, the fixing members 91 and 92 are provided on both sides of the bent portion 64A in the longitudinal direction of the tubular member 60 to keep the arrangement of the electric wire members 20 and 50 as the first arrangement at the bent portion 64A. However, there is no limitation to this configuration. For example, the arrangement of the electric wire members 20 and 50 may be kept as the first arrangement at the bent portion 64A by providing a fixing member at a position corresponding to the bent portion 64A in the longitudinal direction of the tubular member 60.

In the embodiment mentioned above, the fixing member 90 is provided between the connection portion 22 and the holder 70 in the longitudinal direction of the tubular member 60, but there is no limitation to this configuration. For example, the fixing member 90 may also be provided inside the main body portion 71 of the holder 70.

The fixing member 90 of the embodiment mentioned above may be omitted. In this case, for example, the electric wire members 50 may be rearranged such that the arrangement of the electric wire members 20 and 50 is changed from the first arrangement to the second arrangement in the region between the fixing member 91 and the position P1.

There is no particular limitation on the structure of the holder 70 of the embodiment mentioned above. For example, the fixation portion 72 may be omitted from the holder 70. For example, the protruding portion 73 may extend over the entire circumference in the circumferential direction of the main body portion 71. For example, the protruding portion 73 may be omitted from the holder 70. For example, the engagement protrusion 74 may be omitted from the holder 70. In this case, the engagement hole 60X of the tubular member 60 can also be omitted.

In the embodiment mentioned above, the holders 70 and 80 are respectively provided at both end portions 61 and 62 in the longitudinal direction of the tubular member 60, but there is no limitation to this configuration. For example, a configuration may also be employed in which the holder 70 is provided at only one end portion in the longitudinal direction of the tubular member 60.

Figure 14:
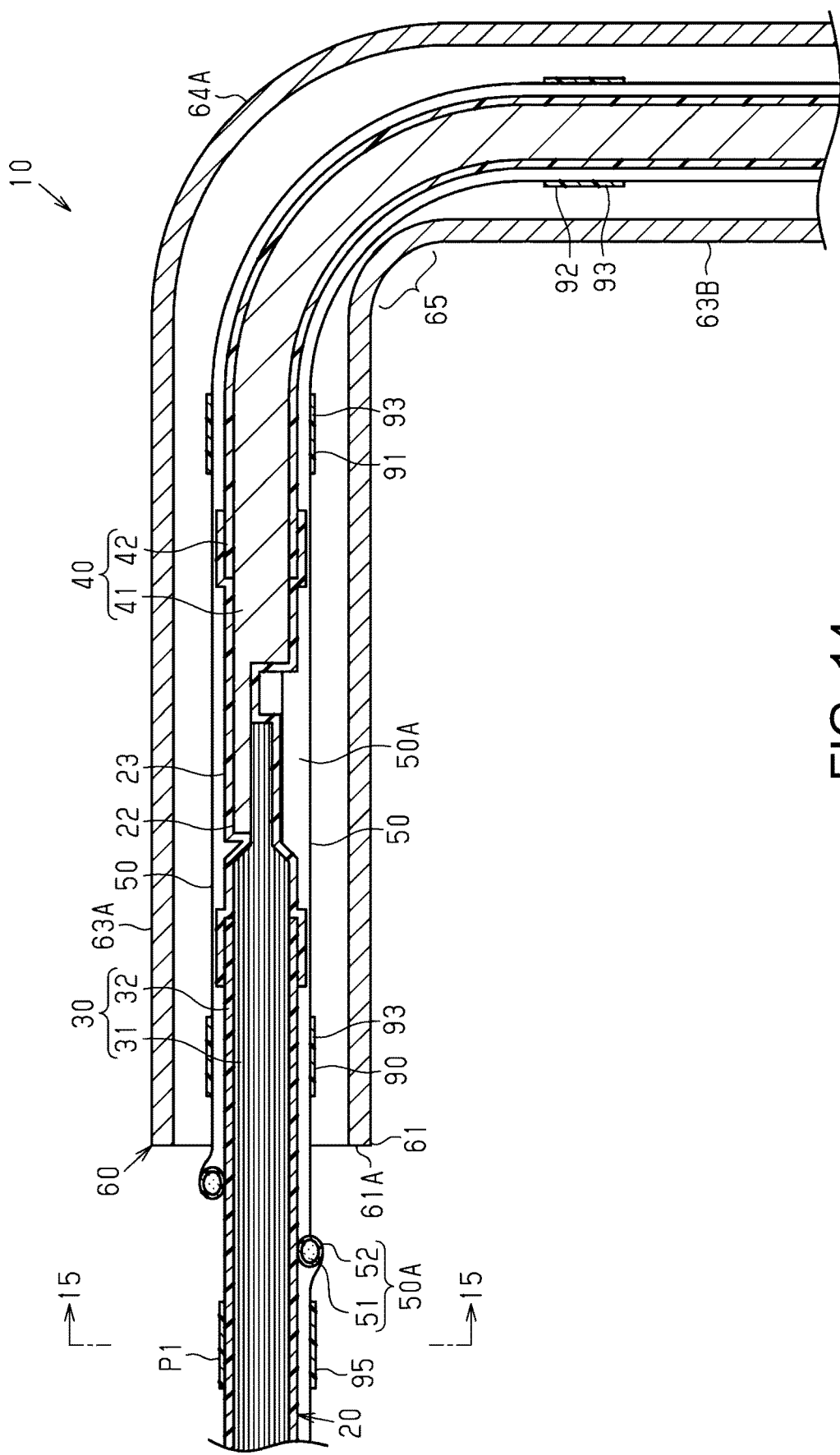
FIG. 14 is a schematic lateral cross-sectional view illustrating a wire harness of a modified example.

As shown in FIG. 14, the holder 70 shown in FIG. 2 may be omitted. In this case, the two electric wire members 20 and the two electric wire members 50 are bundled using the fixing member 95 at the position P1.

Figure 15:
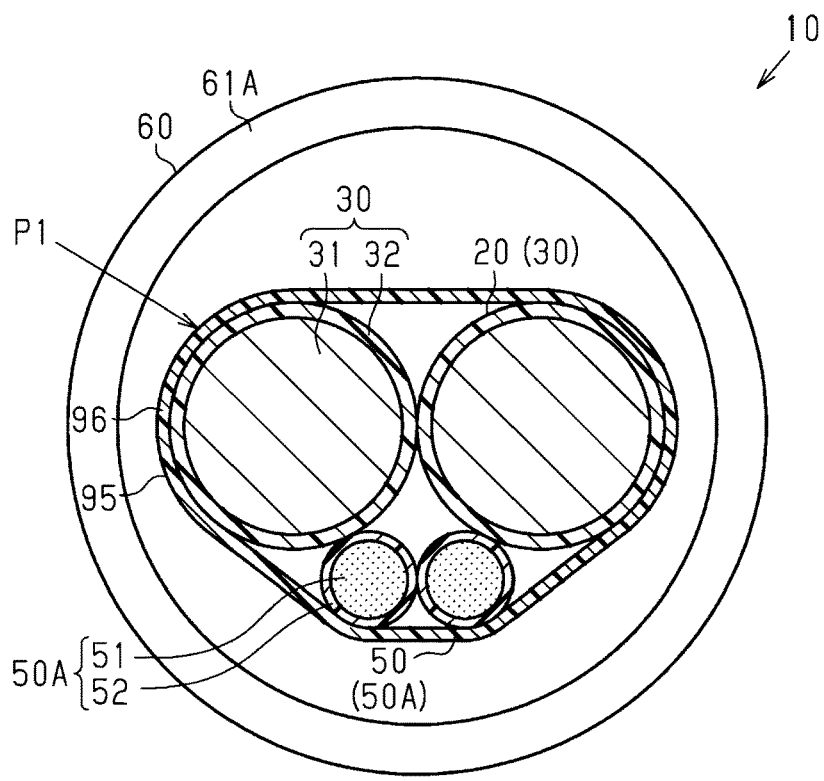
FIG. 15 is a schematic lateral cross-sectional view illustrating the wire harness of the modified example (a cross-sectional view taken along line 15-15 in FIG. 14).
Figure 16:
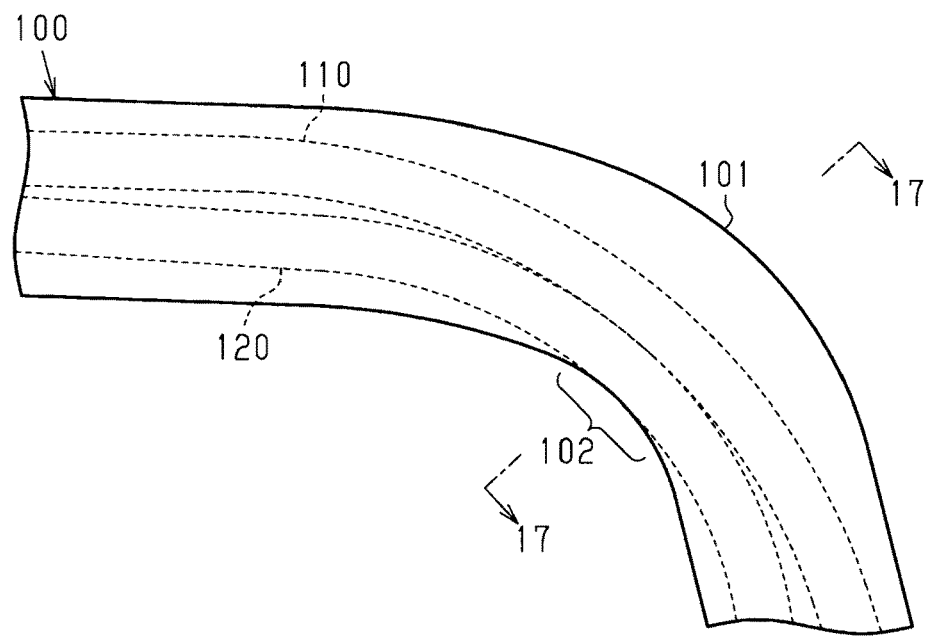
FIG. 16 is a schematic side view illustrating a conventional wire harness.
Figure 17:
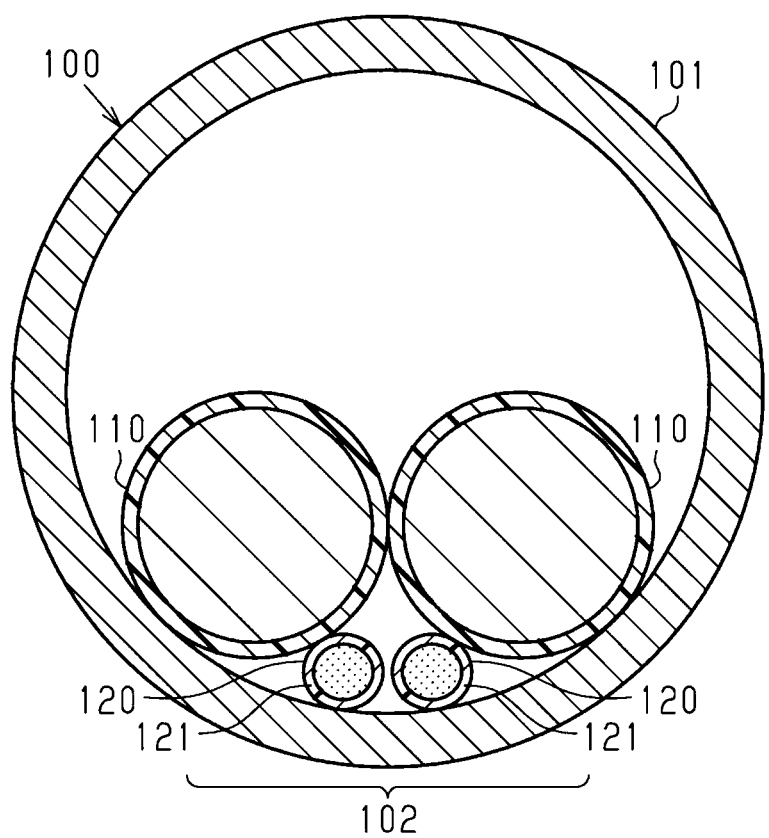
FIG. 17 is a schematic lateral cross-sectional view illustrating the conventional wire harness (a cross-sectional view taken along line 17-17 in FIG. 16).

As shown in FIG. 15, the two flexible electric wires 30 and the two flexible electric wires 50A are bundled together by winding a tape member 96 constituting the fixing member 95 onto the outer circumferences of the two flexible electric wires 30 and the outer circumferences of the two flexible electric wires 50A at the position P1. Thus, the arrangement of the two flexible electric wires 30 and the two flexible electric wires 50A is kept as the second arrangement.

As shown in FIG. 14, a configuration may also be employed in which the electric wire member 50 is rearranged such that the arrangement of the electric wire members 20 and 50 is changed from the first arrangement to the second arrangement outside the tubular member 60. For example, the electric wire member 50 may be rearranged only outside the tubular member 60.

Incidentally, as shown in FIG. 9, when the electric wire member 50 is rearranged, the two electric wire members 20 and one electric wire member 50 are lined up in the first direction at a portion at which the one electric wire member 50 is routed along a portion of the outer circumferential surface of one electric wire member 20 that is the farthest from the other electric wire member 20. Accordingly, while the electric wire member 50 is being rearranged, a portion in the collective structure constituted by the electric wire members 20 and 50 increases in size in the first direction. In such a case, in this modified example, the electric wire member 50 is rearranged only outside the tubular member 60 as shown in FIG. 14, and therefore, there is no need to increase the inner diameter of the tubular member 60 according to the size during the rearrangement of the electric wire member 50. Accordingly, it is possible to suppress an increase in the size of the tubular member 60, and thus suppress an increase in the size of the wire harness 10.

Although the holder 70 is omitted in the modified example shown in FIG. 14, the electric wire member 50 may also be rearranged only outside the tubular member 60 in an aspect that includes the holder 70. In this case, the electric wire member 50 is rearranged, for example, within a region provided with the fixation portion 72 and the fixing member 95 in the longitudinal direction of the electric wire members 20 and 50.

In the embodiment mentioned above, the fixing members 90, 91, and 92 are constituted by the tape member 93, and the fixing members 95 and 95A to 95D are respectively constituted by the tape members 96 and 96A to 96D, but there is no limitation to this configuration. For example, metal bands or resin zip ties may also be used as the fixing members 90, 91, 92, 95, and 95A to 95D.

There is no particular limitation on the number of electric wire members 20 and 50 that pass through the tubular member 60 in the embodiment mentioned above, and the number of electric wire members 20 and 50 can be changed in accordance with the specifications of the vehicle V. The number of electric wire members 20 may also be, for example, three or more. Also, the number of electric wire members 50 may also be, for example, three or more.

There is no particular limitation on the structure of the tubular member 60 of the embodiment mentioned above. For example, there is no particular limitation on the number of bent portions 64A, 64B, and 64C in the tubular member 60. Also, there is no particular limitation on the bending angles of the bent portions 64A, 64B, and 64C.

The plurality of connection portions 22 in the embodiment mentioned above may also be arranged at positions that are shifted from each other in the longitudinal direction of the electric wire members 20. Moreover, the plurality of connection portions 22 may also be arranged side by side extending in the longitudinal direction of the electric wire members 20.

The tubular member 60 of the embodiment mentioned above is not limited to a metal member or resin member made of a single material. For example, the tubular member 60 may also be a complex member obtained by providing a conductive shielding layer on or inside a non-metal pipe main body.

In the embodiment mentioned above, an exterior member having, for example, a branched path may be provided between the tubular member 60 and the exterior members 66 and 67. An example of such an exterior member is a waterproof cover made of (a) rubber.

Although not specifically stated in the embodiment mentioned above, a configuration may also be employed in which an electromagnetic shield member is provided inside the tubular member 60. For example, the electromagnetic shield member collectively surrounds the plurality of electric wire members 20. The electromagnetic shield member is provided, for example, between the inner circumferential surface of the tubular member 60 and the outer circumferential surfaces of the electric wire members 20. Examples of the electromagnetic shield member include flexible braided wires and metal foils.

In the embodiment mentioned above, both the electric wire member 20 (constituted by the flexible electric wire 30 and the hard electric wire 40) and the electric wire member 50 (constituted by the flexible electric wire 50A) are realized as non-shielded electric wires, but there is no limitation to this configuration. For example, the electric wire member 20 may be a non-shielded electric wire, and the electric wire member 50 may be a shielded electric wire. For example, the electric wire member 20 may be a shielded electric wire, and the electric wire member 50 may be a non-shielded electric wire. For example, both of the electric wire members 20 and 50 may be shielded electric wires.

In the embodiment mentioned above, the outer diameters of the electric wire members 50 are smaller than the outer diameters of the electric wire members 20, but there is no limitation to this configuration. The outer diameters of the electric wire members 50 may be the same as the outer diameters of the electric wire members 20 or larger than the outer diameters of the electric wire members 20.

The positional relationship between the electric apparatuses M1 to M4 in the vehicle V is not limited to that of the embodiment mentioned above, and may also be changed as appropriate in accordance with the vehicle configuration.

The embodiments disclosed herein are exemplary in all respects, and should be construed as being not limitative. The scope of the present disclosure is indicated by the scope of the appended claims rather than the above description, and all changes that fall within the same essential spirit as the scope of the claims are intended to be included therein.

What is claimed is:

1. A wire harness comprising:
   a plurality of first electric wire members that each have a first flexible electric wire and a hard electric wire electrically connected to the first flexible electric wire:
   a plurality of second electric wire members that are second flexible electric wires:
   a tube through which the plurality of first electric wire members and the plurality of second electric wire members pass: and
   a first fixing member for bundling the plurality of first electric wire members and the plurality of second electric wire members, wherein:
   the tube includes a bend closest to an end surface in a longitudinal direction of the tube,
   the wire harness is configured to achieve a first arrangement and a second arrangement,
   an arrangement of the plurality of first electric wire members and the plurality of second electric wire members inside the bend is the first arrangement in which the plurality of first electric wire members are lined up in a first direction and the plurality of second electric wire members are lined up in a second direction that intersects the first direction in a state in which the plurality of first electric wire members are located therebetween, and
   an arrangement of the plurality of first electric wire members and the plurality of second electric wire members at a first position located outside the tube is the second arrangement in which the plurality of first electric wire members are lined up in a third direction and the plurality of second electric wire members are lined up in a state in which the plurality of first electric wire members are not located therebetween.

2. The wire harness according to claim 1, wherein:
   the plurality of first electric wire members have a circular lateral cross-sectional shape,
   the plurality of second electric wire members have a circular lateral cross-sectional shape, and
   in the first arrangement, the plurality of first electric wire members are in external contact with each other, and the plurality of second electric wire members are respectively provided in a plurality of gaps formed between outer circumferences of the plurality of first electric wire members.

3. The wire harness according to claim 1, further comprising:
   a holder attached to an end in the longitudinal direction of the tube; and
   a second fixing member for fixing the plurality of first electric wire members and the plurality of second electric wire members to the holder, wherein:
   the holder includes a tubular main body, and a fixation portion that protrudes from an end surface in an axial direction of the main body and is arranged outside the tube,
   the second fixing member fixes the plurality of first electric wire members and the plurality of second electric wire members to the fixation portion,
   the first position is a position at which the second fixing member is provided, and
   at the first position, the plurality of second electric wire members are provided at a position where the plurality of second electric wire members are not sandwiched between the fixation portion and the plurality of first electric wire members and are spaced apart from the fixation portion.

4. The wire harness according to claim 3, wherein the plurality of first electric wire members overlap a straight line extending from the fixation portion in a radial direction of the main body.

5. The wire harness according to claim 1, wherein:
   each first electric wire member of the plurality of first electric wire members includes a connection where the first flexible electric wire and the hard electric wire are joined to each other,
   the connection is provided between the bend and the first position in a longitudinal direction of the plurality of first electric wire members and is housed inside the tube, and
   at least one second electric wire member of the plurality of second electric wire members is rearranged, thereby changing an arrangement of the plurality of first electric wire members and the plurality of second electric wire members from the first arrangement to the second arrangement in a region between the connection and the first position.

6. The wire harness according to claim 5, wherein:
   the first fixing member is provided between the connection and the first position in the longitudinal direction of the plurality of first electric wire members, and
   the first fixing member keeps the arrangement of the plurality of first electric wire members and the plurality of second electric wire members as the first arrangement.

7. The wire harness according to claim 6,
wherein at least one second electric wire member of the plurality of second electric wire members is rearranged, thereby changing an arrangement of the plurality of first electric wire members and the plurality of second electric wire members from the first arrangement to the second arrangement in a region between the first fixing member and the first position.

8. The wire harness according to claim 1,
wherein at least one second electric wire member of the plurality of second electric wire members is rearranged, thereby changing an arrangement of the plurality of first electric wire members and the plurality of second electric wire members from the first arrangement to the second arrangement outside the tube.

9. The wire harness according to claim 1, wherein:
the hard electric wires in a longitudinal direction of the plurality of first electric wire members are provided at the bend, and
the first flexible electric wires in the longitudinal direction of the plurality of first electric wire members are provided at the first position.

* * * * *